(12) United States Patent
Kim et al.

(10) Patent No.: US 9,722,437 B2
(45) Date of Patent: Aug. 1, 2017

(54) BALANCING DEVICE AND METHOD

(71) Applicant: SILICON WORKS CO., LTD., Daejeon-si (KR)

(72) Inventors: Jae Wan Kim, Daejeon-si (KR); Myoung Soo Song, Daejeon-si (KR); Jin Kook Yun, Daejeon-si (KR)

(73) Assignee: SILICON WORKS CO., LTD., Daejeon-si (KR)

( * ) Notice: Subject to any disclaimer, the term of this patent is extended or adjusted under 35 U.S.C. 154(b) by 162 days.

(21) Appl. No.: 14/623,805

(22) Filed: Feb. 17, 2015

(65) Prior Publication Data

US 2015/0236534 A1    Aug. 20, 2015

(30) Foreign Application Priority Data

Feb. 18, 2014  (KR) .................. 10-2014-0018338

(51) Int. Cl.
   *H02J 7/00* (2006.01)
(52) U.S. Cl.
   CPC .................. *H02J 7/0016* (2013.01)
(58) Field of Classification Search
   CPC .......... H02J 7/00; H02J 7/0014; H02J 7/0016
   USPC .................. 320/108, 103, 134, 166, 118
   See application file for complete search history.

(56) References Cited

U.S. PATENT DOCUMENTS

| | | | |
|---|---|---|---|
| 8,339,100 B2 | 12/2012 | Li et al. | |
| 8,344,694 B2 | 1/2013 | Zhang et al. | |
| 2010/0295383 A1* | 11/2010 | Cummings | ....... H01L 31/02021 307/151 |
| 2011/0241622 A1* | 10/2011 | Li | ............ H01M 10/42 320/116 |
| 2011/0267005 A1 | 11/2011 | Gollob et al. | |
| 2011/0285352 A1* | 11/2011 | Lim | ....... H02J 7/0019 320/118 |
| 2013/0214724 A1 | 8/2013 | Schwartz | |

(Continued)

FOREIGN PATENT DOCUMENTS

JP          2013-13292          1/2013

OTHER PUBLICATIONS

Stephen W. Moore, "A Review of Cell Equalization Methods for Lithium Ion and Lithium Polymer Battery Systems", Society of Automotive Engineers, 2001.

(Continued)

*Primary Examiner* — Richard Isla Rodas
*Assistant Examiner* — Dung V Bui
(74) *Attorney, Agent, or Firm* — Kile Park Reed & Houtteman PLLC

(57) ABSTRACT

Provided are balancing device and method which can achieve a balancing function between energy storage units connected in series using a small number of switch elements, thereby reducing the manufacturing cost and size and enabling various balancing modes. The balancing device for balancing between a plurality of energy storage units a battery module, in which the energy storage units are connected in series, includes: a transformer; and a switch network comparing a cell switch unit, a polarity switch unit, and au auxiliary switch unit, wherein the auxiliary switch unit includes: a first auxiliary switch unit for connecting a second common node to one terminal of the secondary winding of the transformer; and a second auxiliary switch unit for connecting a first common node to the other terminal of the secondary winding of the transformer.

19 Claims, 27 Drawing Sheets

(56) References Cited

U.S. PATENT DOCUMENTS

| | | | |
|---|---|---|---|
| 2013/0320914 A1 | 12/2013 | Li | |
| 2014/0028263 A1* | 1/2014 | Jo | H02J 7/0016 320/128 |
| 2015/0236534 A1* | 8/2015 | Kim | H02J 7/0016 320/118 |

OTHER PUBLICATIONS

EMB1428Q Switch Matrix Gate Driver, Texas Instruments, May 2013.
EMB1499Q Bidirectional Current DC-DC Controller, Texas Instruments, Sep. 2013.
Jong-Won Shin et al., "Selective Flyback Balancing Circuit with Improved Balancing Speed for Series Connected Lithium-ion Batteries", The 2010 International Power Electronics Conference, pp. 1180-1184.

\* cited by examiner

BALANCING DEVICE AND METHOD

BACKGROUND

1. Technical Field

The present invention relates to a secondary battery, and more particularly, to a balancing device and method for enabling various balancing modes for a plurality of battery cells connected in series.

2. Related Art

In general, a secondary battery is a battery that is capable of storing energy through a charging process and using the stored energy at the outside of the battery through a discharging process. A battery cell constituting a secondary battery may be limited in voltage due to chemical or structural problems. Accordingly, in application fields in which a high voltage is necessary, a secondary battery in which a necessary number of battery cells are connected in series is used. Even when battery cells are manufactured under the same manufacturing conditions and the same environments, the battery cells differ from each other in electrical characteristics. In addition, while the battery cells are being used, there may be a difference even in a degree that the internal properties of batteries are deteriorated. Accordingly, even when the battery cells are charged and discharged with the same current, an imbalance in a voltage or an imbalance in a remaining amount of charge between the battery cells connected to each other may occur.

When the voltage of a battery cell is too high, there is a danger of a fire or an explosion. In contrast, when the voltage of a battery cell is too low, the characteristics of the battery cell may be lost. In order to prevent such problems, when any one of a plurality of battery cells is overcharged or over-discharged, charging or discharging of the entire battery cells may be controlled. That is to say, when some of a plurality of battery cells connected in series are overcharged more than the other battery cells, charging of the battery cells is interrupted in a state in which the other battery cells have not been sufficiently changed. In contrast, when some of the battery cells are over-discharged, use of the battery cells is restricted in a state in which the other battery cells yet have usable energy.

When the imbalance in a voltage or the imbalance in a remaining amount of charge between the battery cells connected in series occurs, as described above, the usable voltage range of the battery cells is reduced or the charging and discharging periods are shortened, thereby shortening the lifecycle of the battery cells. In order to overcome such problems, balancing methods for uniformly maintain the voltages and the amounts of charge of battery cells have been suggested.

The conventional balancing methods for battery cells may be largely classified into a passive method for performing balancing of battery cells while consuming energy and an active method for performing balancing of battery cells while not consuming energy.

The passive balancing method is inefficient because overcharged energy is consumed through a resistor in order to balance energy between battery cells. For this reason, more researches have been conducted on the active balancing method.

The active balancing method may be classified into a method of using a magnetic element, such as a transformer or an inductor, as an energy transfer medium, and a method of using a capacitor as an energy transfer medium.

Recently, balancing of battery cells has been required to reduce the manufacturing cost and the size thereof using a small number of switching elements, and simultaneously, to enable various modes.

THE PRIOR ART

Paper: Moore et al., "A review of cell equalization methods for lithium ion and lithium polymer battery systems", Society of Automotive Engineers, 2001

Patent Document: U.S. Pat. No. 8,344,694 B2

SUMMARY

Various embodiments are directed to a balancing device and method for performing a balancing function between energy storage units connected in series, especially, between battery cells connected in series.

Also, various embodiments are directed to a balancing device and method for enabling various balancing modes while reducing the manufacturing cost and the size using a small number of switching elements.

In order to achieve the above object, according to one aspect of the present invention, there is provided a balancing device for balancing for an energy storage module including a plurality of energy storage units connected in series between a first connection terminal and a second connection terminal, the device including: a transformer including a primary and secondary windings; and a switch network for dividing nodes between the first connection terminal, the plurality of energy storage units, and the second connection terminal into a first group and a second group, forming a first common node corresponding to nodes of the first group, forming a second common node corresponding to nodes of the second group, selectively connecting each of both terminals of the primary winding of the transformer to the first common node or the second common node, and connecting both terminals of the secondary winding of the transformer to the first common node and the second common node, respectively.

According to another aspect of the present invention, there is provided a balancing method for an energy storage module in which a plurality of energy storage units are connected in series, wherein a balancing device includes a switch network and a transformer, the transformer includes two windings, and the switch network includes a plurality of switches which are configured to selectively connect each of four terminals of the two windings of the transformer to at least one of terminals of the plurality of energy storage units, the balancing method including an inductor mode operation and including the steps of: allowing the transformer to be supplied with energy through one winding of the two windings from at least one of the energy storage units; and allowing the transformer to supply energy to at least one of other energy storage units through the one winding used when energy is supplied.

According to still another aspect of the present invention, there is provided a balancing device for balancing for a battery module including a plurality of battery cells connected in series to each other, the balancing device including: a transformer including a primary and secondary windings; and a switch network provided between the battery module and the primary and secondary windings of the transformer, and configured to include a plurality of switches for performing selectively switching, wherein the switch network performs by selecting one mode among a mode for transferring energy from at least one battery cell to at least another battery cell, a mode for transferring energy from at least one battery cell to the battery module, and a mode for transferring energy from the battery module to at least another battery cell, according to selective switching of the plurality of switches.

According to the embodiments, the balancing device and method can achieve a balancing function between energy storage units connected in series using a small number of switch elements, so that the manufacturing cost and the size can be reduced and various balancing modes are available, and various current gains can be selected using the winding ratio of a transformer.

Since the various balancing modes and various current gains are available, the degree of freedom in an algorithm design for performing balancing of the entire battery cells can increase, and effective balancing can be rapidly performed.

DETAILED DESCRIPTION

Hereinafter, a balancing device and method will be described in detail with reference to the accompanying drawings through various examples of embodiments.

FIGS. 1 to 4 are brief circuit diagrams explaining examples for an active balancing device according to the present invention. A brief description about an active cell-balancing technology using a transformer is as follows.

Figure 1:
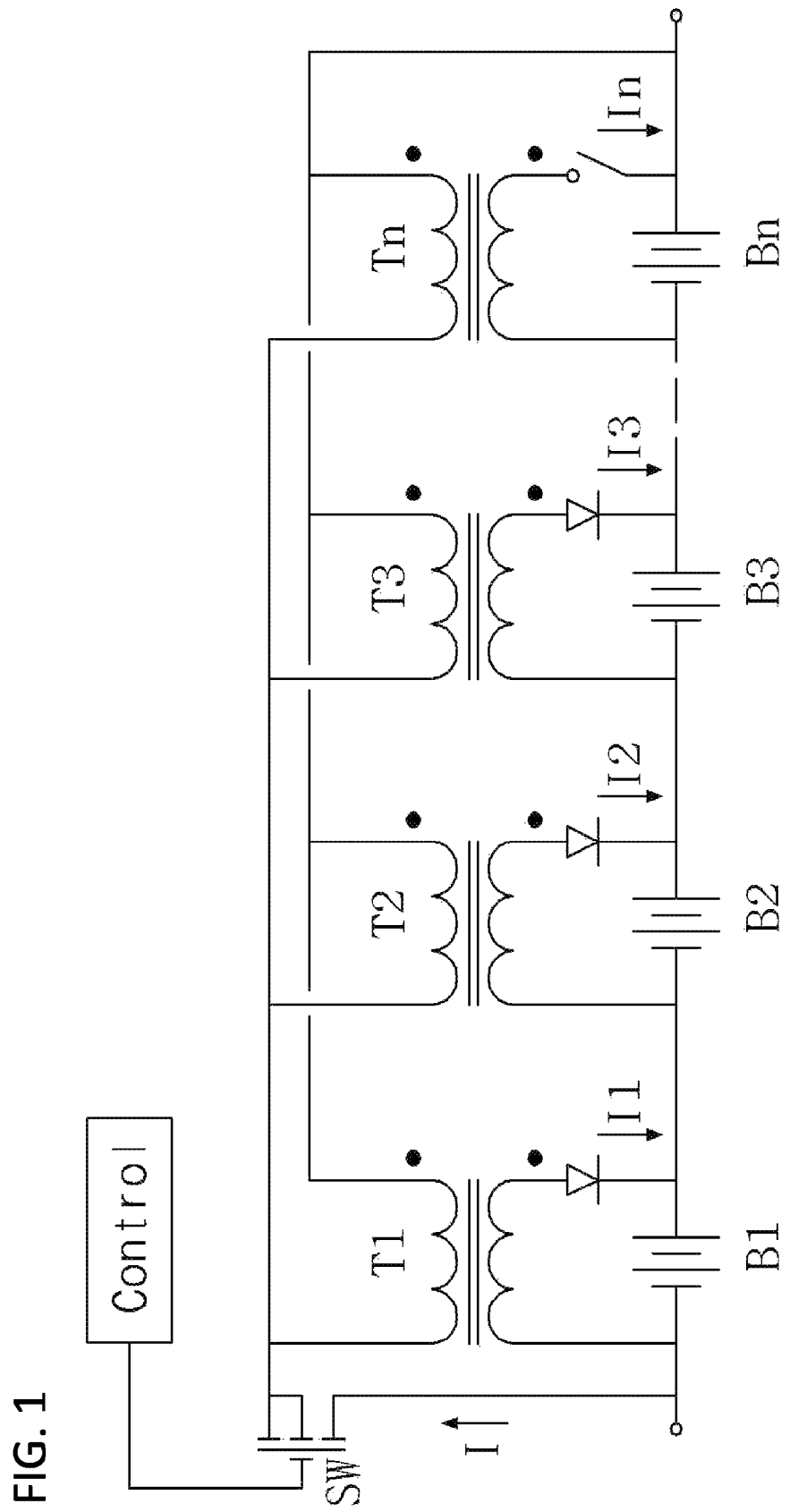
FIGS. 1 to 4 are brief circuit diagrams explaining examples for an active balancing device according to the present invention.

Referring to FIG. 1, FIG. 1 shows a scheme in which transformers T1 to Tn are used for battery cells B1 to Bn, respectively. When a switching element SW of FIG. 1 is turned on/off, energy is transferred to each battery cell through the transformers T1 to Tn and diodes. In this case, since more current flows to a battery cell having a lower voltage, a balancing function is performed. The balancing device of FIG. 1 can perform balancing through energy transference from the battery module including the entire battery cells B1 to Bn to a battery cell.

Figure 2:
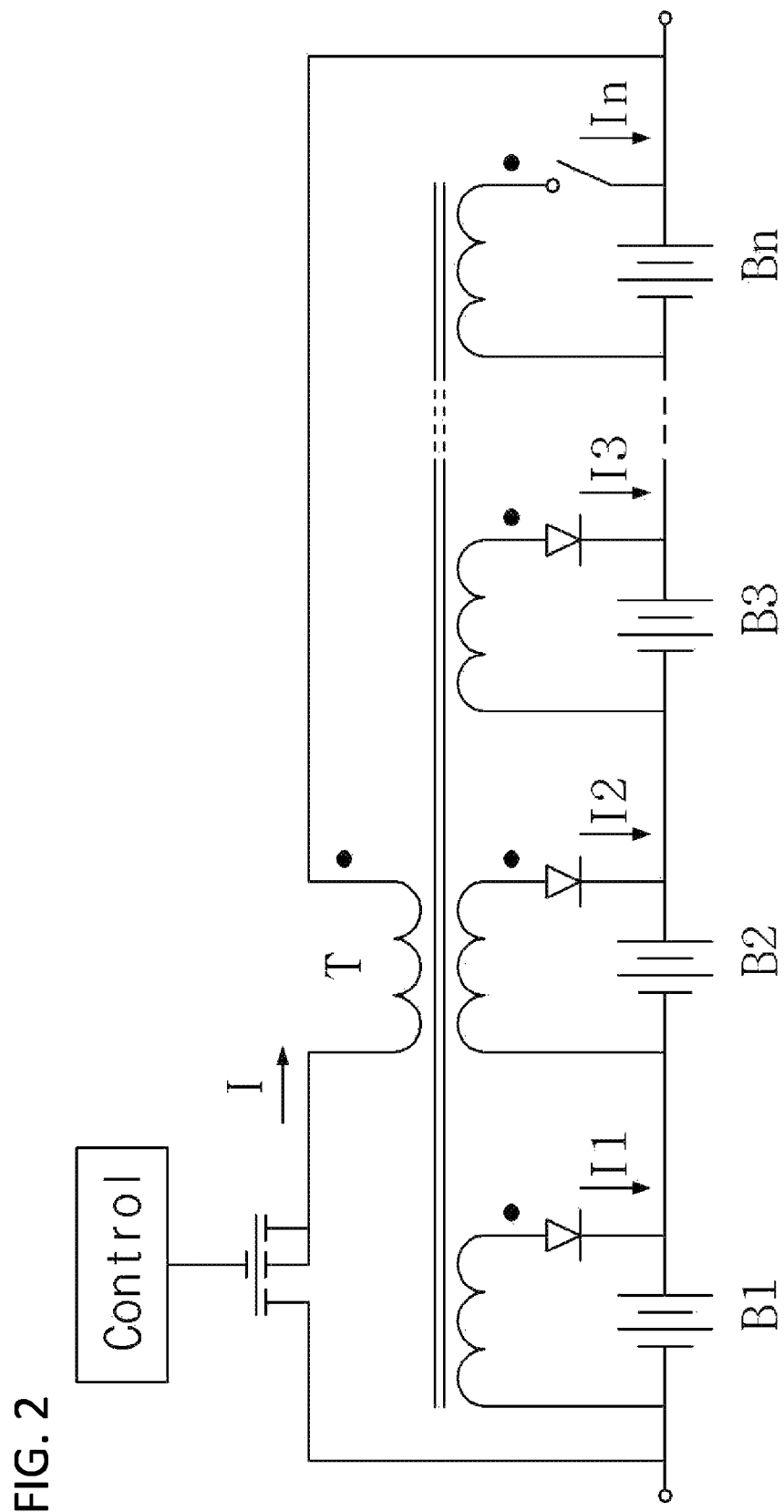

As compared with the balancing device of FIG. 1, the balancing device of FIG. 2 is different from that of FIG. 1 in configuration in that the former includes only one transformer. The balancing device of FIG. 2 also performs a balancing function through energy transference from a battery module to a battery cell. The balancing device of FIG. 2 may have difficulty in application when a large number of battery cells exist because a number of secondary windings equal to the number of battery cells must be disposed with respect to one transformer.

Figure 3:
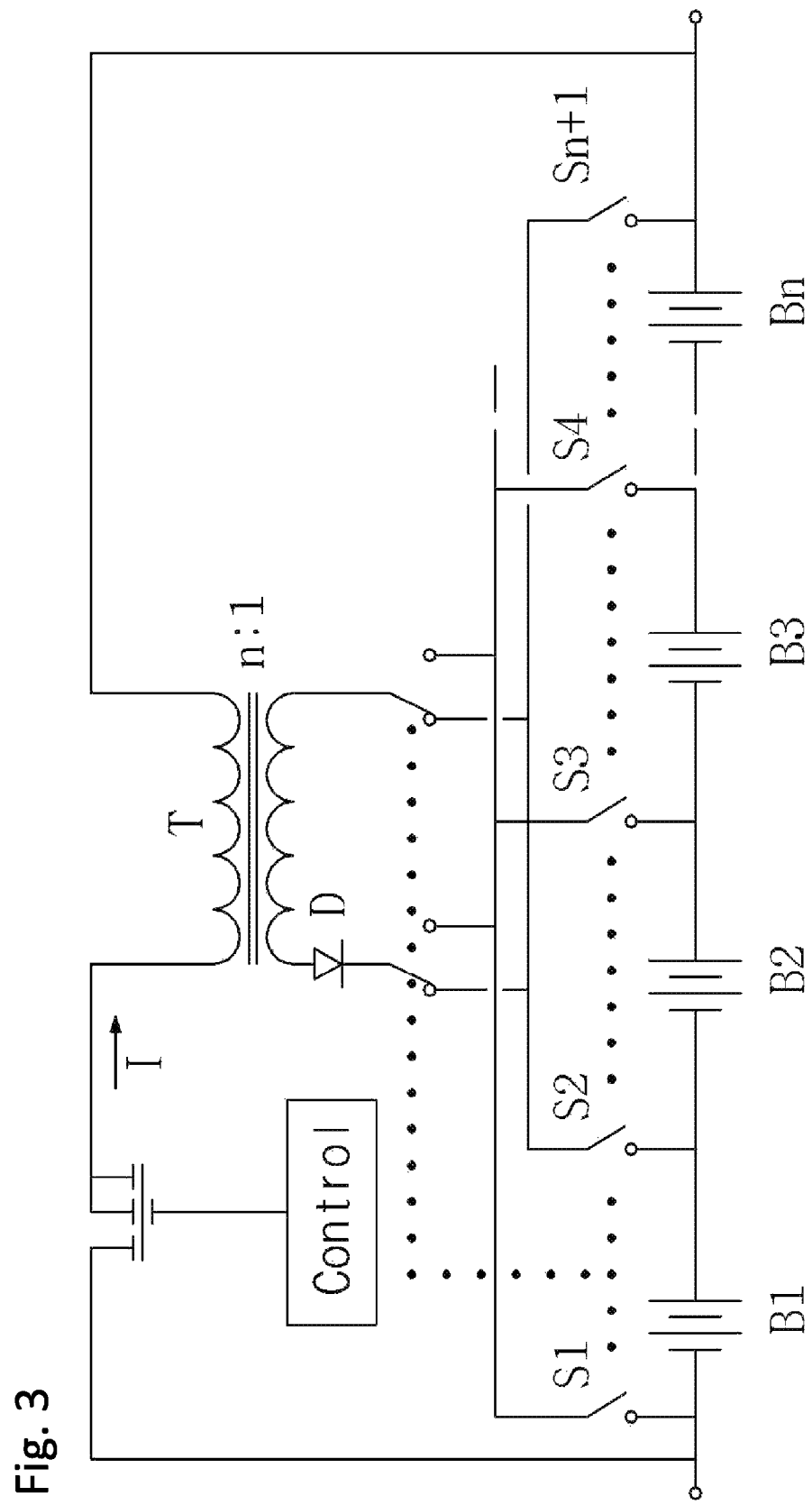

FIG. 3 shows a balancing device which includes a magnetic element and a transformer including only one primary winding and one secondary winding, and performs a balancing function by selectively connecting each battery cell to the secondary winding of the transformer through a switch network S1-Sn+1 to select a battery cell to be charged. As compared with the balancing devices of FIGS. 1 and 2, the balancing device of FIG. 3 has an advantage in that the number of transformers and the number of windings are relatively small. However, in view of a balancing function, the balancing function is restricted in that only energy transference from a battery module to a battery cell can be controlled as ever.

Figure 4:
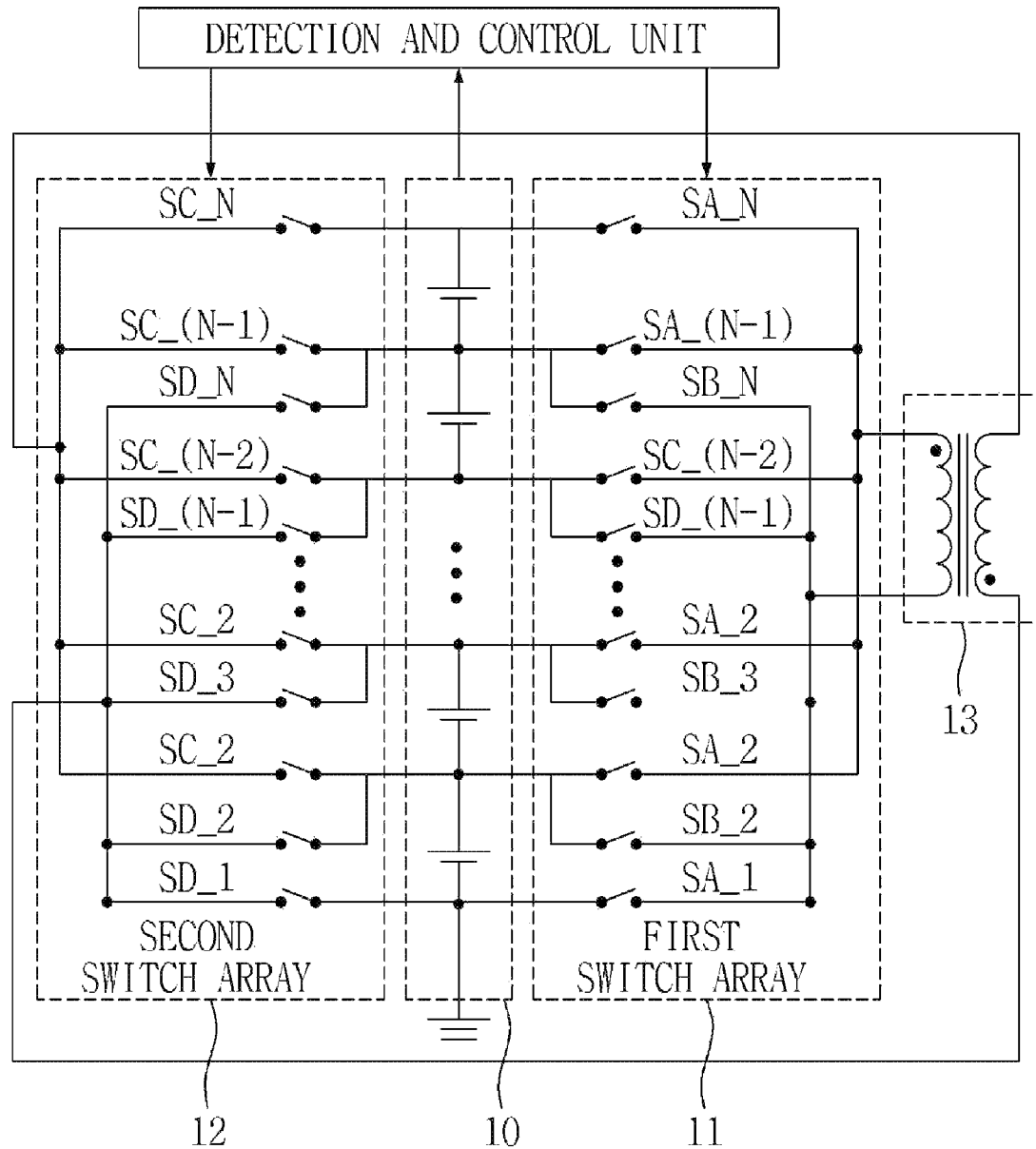

The balancing device of FIG. 4 uses a method of selecting a battery cell to be connected to the primary winding and secondary winding of a transformer 13 through a first switch array 11 and a second switch array 12 while using only the transformer 13. Each of the first and second switch arrays 11 and 12 is configured to select a battery cell to be connected to each winding and a connection direction. The balancing device enables a control for energy transference from a battery cell to a battery cell (cell-to-cell), from a battery cell to a battery module (cell-to-module), and from a battery module to a battery cell (module-to-cell), so that various balancing modes can be selected. The balancing device of FIG. 4 must include a number of switching elements equal to two times the number "N" of battery cells in each of the two switching arrays 11 and 12, and thus requires a total number of switching elements equal to four times the number of battery cells. In addition, each switch element used in the device of FIG. 4 must be a two-way controllable switch element. Thus, when a field-effect transistor (FET) which is most widely used is used, two switch elements are required for each switch element.

Figure 5:
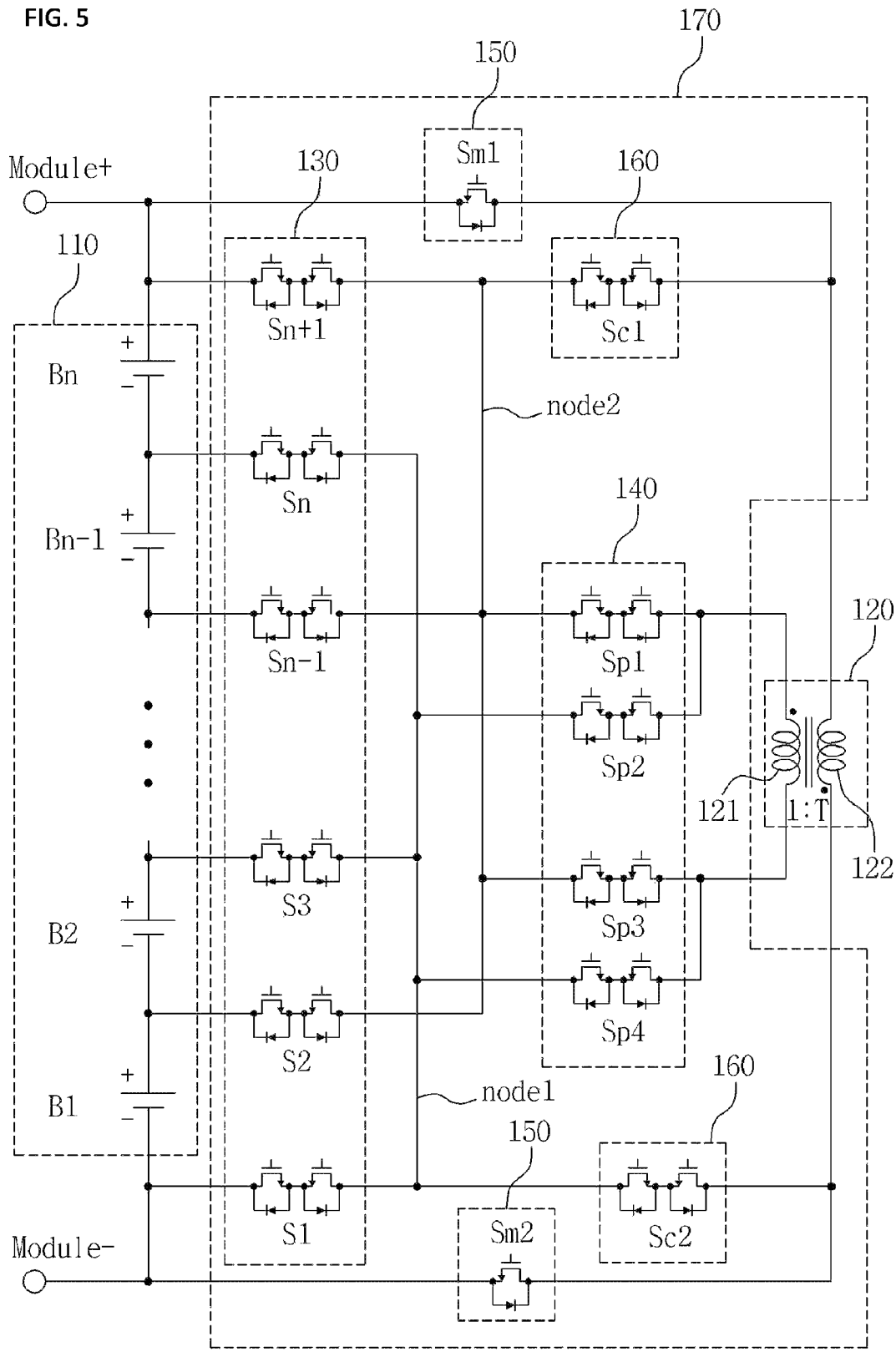
FIG. 5 is a detailed circuit diagram explaining the configuration of a balancing device in accordance with an embodiment of the present invention.

FIG. 5 is a detailed circuit diagram explaining the configuration of a balancing device in accordance with an embodiment of the present invention. The balancing device in accordance with an embodiment of the present invention performs balancing for solving imbalance in the amount of charge or energy between battery cells B1 to Bn included in a battery module 110. The balancing device includes a transformer 120 and a switch network 170. The switch network 170 selectively includes a cell switch unit 130, a polarity switch unit 140, a module switch unit 150, and an auxiliary switch unit 160.

The battery module 110 includes a plurality of battery cells B1 to Bn connected in series. The balancing device according to the present invention can be applied even to various types of energy storage units and energy storage modules, in addition to batteries. The embodiments of the present invention will be described with an example where a battery cell is used as an energy storage unit, and a battery module is used as an energy storage module. Here, a "cell"

means a unit element in view of performing a balancing function, and may be one battery cell or may be a set of battery cells constituted by a plurality of battery cells. The battery module 110 may be connected to another battery module through connection terminals Module+ and Module− to form one battery device, or may form one battery device by itself. When only one battery module is used to form one battery device, the connection terminals Module+ and Module− may perform a function for connecting the battery module to the outside. When a plurality of battery modules are connected in series and are used, the balancing device according to the present invention may be used for balancing between battery cells, balancing between a battery cell and a battery module, and/or balancing between battery modules. Hereinafter, for convenience of description, a battery cell will be briefly referred to as a "cell", and a battery module will be briefly referred to as a "module" according to necessity.

The transformer 120 includes two windings 121 and 122 between which magnetic flux is coupled. It is exemplified that a winding ratio of a primary winding 121 to a secondary winding 122 is 1:T. Although the two windings of the transformer 120 is exemplified to have mutually different directional dots, which are signs defining winding directions, the winding directions of the two windings may be equal to each other, or the positions of the dots for the windings may be opposite to those shown in FIG. 5. Each winding of the transformer 120 is selectively connected to a cell, cells, and a module through the switch network 170, thereby performing a balancing function of accumulating and then transferring energy. According to an embodiment of the present invention, the two windings of the transformer 120 may be magnetically connected and operate, as a normal transformer, or may perform a balancing function by operating as an inductor with only one winding, not utilizing both windings. Such operations will be described later. In addition, although the transformer 120 of FIG. 5 is exemplified to include two windings, the transformer may be configured to perform additional or necessary functions, such as generating power for control, by adding windings according to necessity.

The switch network 170 selectively includes any one or more switches among the cell switch unit 130, the polarity switch unit 140, the module switch unit 150, and the auxiliary switch unit 160, and functions to electrically connect each winding of the transformer 120 to a desired cell or cells while performing a switching operation according to a switched-on/off signal of a controller (not shown).

The cell switch unit 130 divides the connection terminals Module+ and Module− and nodes between a plurality of energy storage units connected in series between connection terminals into a first group and a second group, forms common node 1 corresponding to nodes of the first group, and forms common node 2 corresponding to nodes of the second groups. For example, the cell switch unit 130 may include a number of two-way switches, which is controllable in both directions, equal to the number of cells. The embodiment of the present invention shown in FIG. 5 shows a case where a number of switches one more than the number of cells. One terminal of each of switches S1 to Sn+1 in the cell switch unit 130 is connected to a corresponding battery terminal. Among the respective other terminals of the switches S1 to Sn+1 in the cell switch unit 130, the other terminals of odd-numbered switches are connected in common to each other as a first group to form common node 1, and the other terminals of even-numbered switches are connected in common to each other as a second group to form common node 2.

The polarity switch unit 140 may include four two-way switches. Among the four two-way switches, two switches Sp1 and Sp2 are configured to selectively connect a first terminal (dotted terminal) of the primary winding 121 of the transformer 120 to common node 1 or common node 2, and two switches Sp3 and Sp4 are configured to selectively connect a second terminal (non-dotted terminal) of the primary winding 121 of the transformer 120 to common node 1 or common node 2.

Therefore, since each of both terminals of the primary winding 121 of the transformer 120 can be connected to any terminal of a cell in any direction through common node 1 or common node 2 according to the on/off operations of the cell switch unit 130 and the polarity switch unit 140, a desired cell, desired cells and a desired module can be connected with a desired polarity to both terminals of the primary winding 121 of the transformer 120.

The module switch unit 150 may include two single-way controllable switches Sm1 and Sm2. Of one switch Sm1 in the module switch unit 150, one terminal is connected to the "+" terminal of the battery module 110, and the other terminal is connected to the non-dotted terminal of the secondary winding 122 of the transformer 120. Of the other switch Sm2 in the module switch unit 150, one terminal is connected to the "−" terminal of the battery module 110, and the other terminal is connected to the dotted terminal of the secondary winding 122 of the transformer 120. The module switch unit 150 performs a selective connection function between the "+" and "−" terminals of the battery module 110 and the secondary winding 122 of the transformer 120, thereby mainly taking charge of energy transference from the module to a cell or energy transference from a cell to the module.

In addition, of the switch Sm1 in the module switch unit 150, the one terminal is connected to the connection terminal Module+ of the battery module 110 and the "+" terminal of an $n^{th}$ battery cell Bn, and the other terminal is connected to the non-dotted terminal of the secondary winding 122 of the transformer 120. Of the switch Sm2 in the module switch unit 150, the one terminal is connected to the connection terminal Module− of the battery module 110 and the "−" terminal of a first battery cell B1, and the other terminal is connected to the dotted terminal of the secondary winding 122 of the transformer 120. The module switch unit 150 connected as above may be used for charging and discharging of the first battery cell B1 or the $n^{th}$ battery cell Bn.

The auxiliary switch unit 160 may include two two-way switches Sc1 and Sc2. Of one switch Sc1 in the auxiliary switch unit 160, one terminal is connected to common node 2, and the other terminal is connected to the non-dotted terminal of the secondary winding 122 of the transformer 120. Such a switch Sc1 performs a selective connection function between common node 2 and the non-dotted terminal of the secondary winding 122 of the transformer 120. Of the other switch Sc2 in the auxiliary switch unit 160, one terminal is connected to common node 1, and the other terminal is connected to the dotted terminal of the secondary winding 122 of the transformer 120. Such a switch Sc2 performs a selective connection function between common node 1 and the dotted terminal of the secondary winding 122 of the transformer 120. Accordingly, the auxiliary switch unit 160 can perform a function of selecting a cell or cells connected to the secondary winding 122 of the transformer 120 in cooperation with the cell switch unit 130.

According to the embodiment shown in FIG. 5, the switch network 170 includes one or more switches among the cell switch unit 130, the polarity switch unit 140, the module switch unit 150, and the auxiliary switch unit 160, and performs a switching operation of selectively connecting each terminal of the primary winding 121 and/or the secondary winding 122 of the transformer 120 to the terminal of a desired cell among the first to $n^{th}$ battery cells. Therefore, balancing between cells can be performed in such a manner as to supply energy from a desired cell or desired cells to the transformer 120, or to transfer energy stored in the transformer 120 back to a desired cell or desired cells.

Hereinafter, the operation of the balancing device, shown in FIG. 5, for performing a balancing function will be described with reference to FIGS. 6A to 14B. FIGS. 6A to 8B are circuit diagrams explaining a balancing mode from a battery cell to a battery cell in the balancing device of FIG. 5, FIGS. 9A to 11B are circuit diagrams explaining a balancing mode from a battery cell to a battery module in the balancing device of FIG. 5, and FIGS. 12A to 14B are circuit diagrams explaining a balancing mode from a battery module to a battery cell in the balancing device of FIG. 5.

Generally, in a charging or discharging state, the switch network 170 does not operate, and the battery module 110 performs a charging or discharging operation for the entire module through the connection terminals Module+ and Module−. Such an operation is the same as the operation of a normal battery. When an imbalance in voltage and/or energy occurs due to a difference in characteristics between battery cells connected in series or due to a difference in the deteriorated degrees thereof, the usable voltage range of the battery cells is reduced, or charging and discharging periods are shortened, so that the lifecycle of the battery cells is shortened. For this reason, it is necessary to perform a balancing function through energy transference between cells at which an imbalance in voltage and/or energy occurs.

Figure 6A:
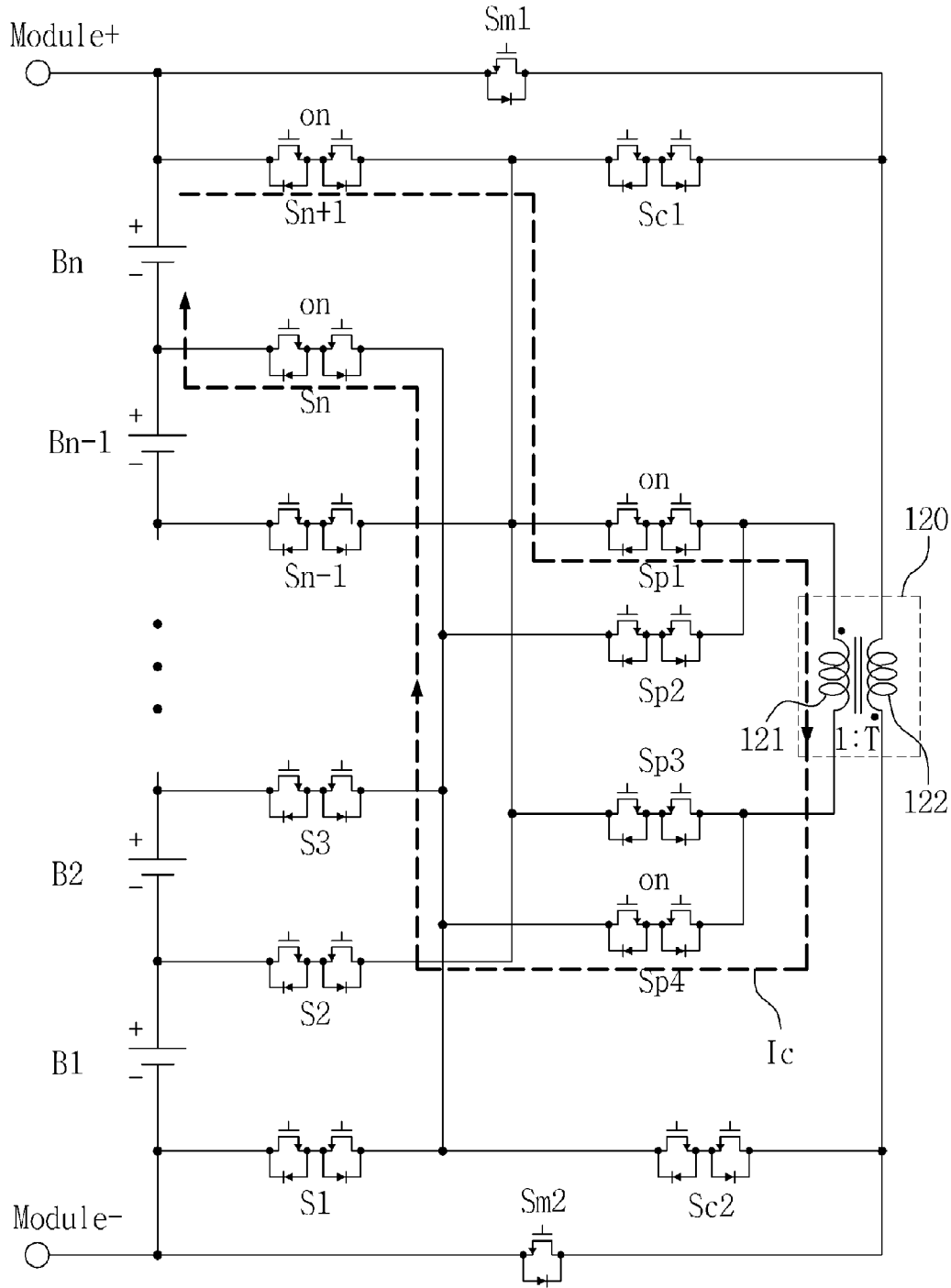
FIGS. 6A to 8B are circuit diagrams explaining a balancing mode from a battery cell to another battery cell in the balancing device of FIG. 5.
Figure 6B:
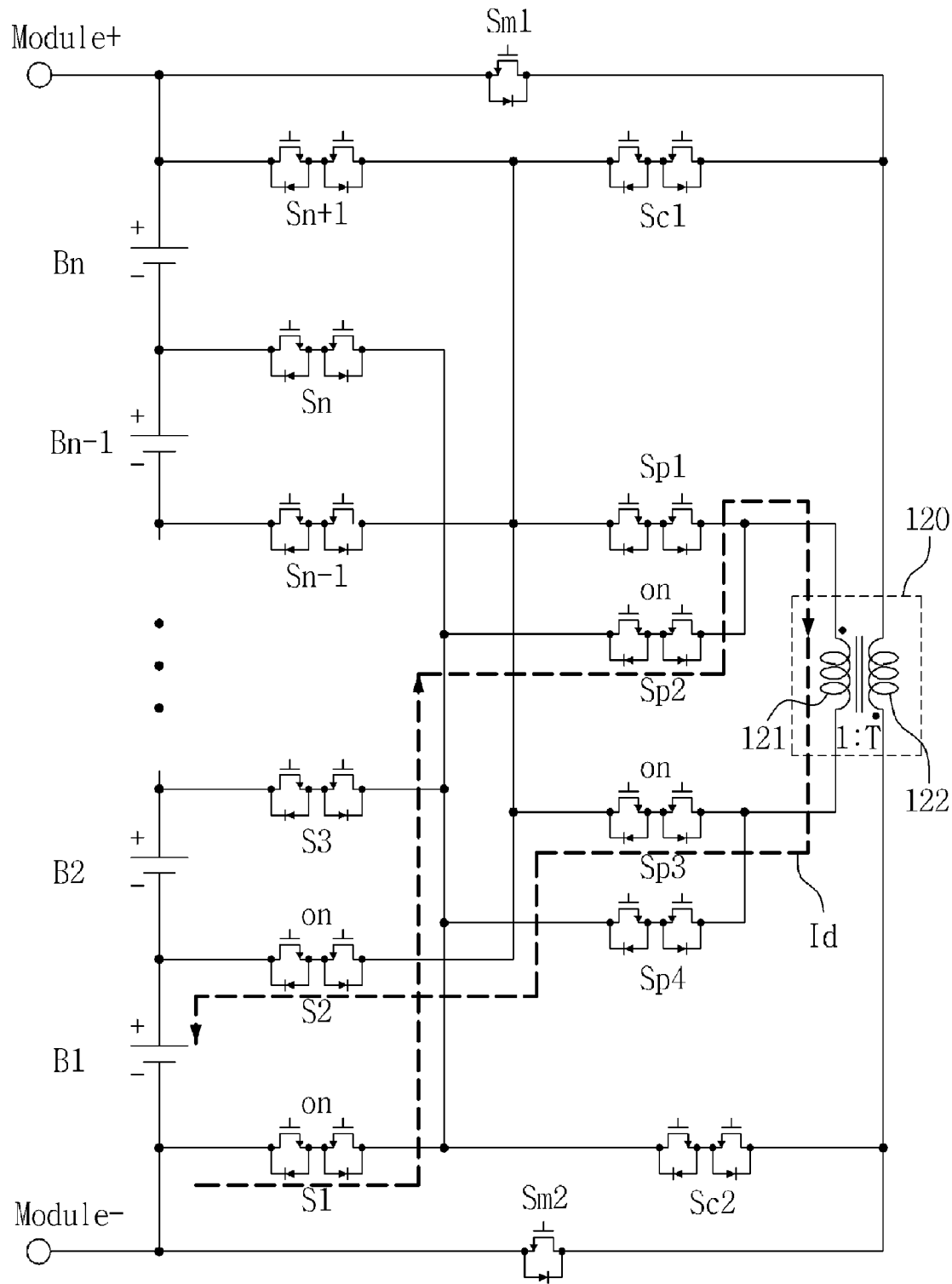

FIGS. 6A and 6B are views explaining an operation (i.e. a first cell-to-cell mode) of performing balancing between a cell B1 and a cell Bn by supplying energy from the cell Bn to the transformer 120 and then transferring the energy stored in the transformer 120 to the cell B1. When switches Sn+1, Sp1, Sp4 and Sn are turned on, the cell Bn is connected to the primary winding 121 of the transformer 120, so that energy of the cell Bn is transferred to the transformer 120 while current is flowing from the cell Bn in a direction of charging the transformer 120, thereby storing the energy in the transformer 120 (see FIG. 6A). Thereafter, switches Sp3, S2, S1, and Sp2 are turned on, current flows from the transformer 120 along a path of charging the cell B1, so that the cell B1 is charged with energy while the energy of the transformer 120 is being discharged (see FIG. 6B). FIGS. 6A and 6B illustrate an operation mode (i.e. a first cell-to-cell mode) for transferring energy from a cell to another cell utilizing the cell switch unit 130, the polarity switch unit 140, and the primary winding 121 of the transformer 120. In the first cell-to-cell mode, since the magnetic flux coupling and the winding ratio between two windings of the transformer 120 are not utilized, but only the primary winding 121 is utilized, the transformer 120 operates as an inductor, so that the magnitudes of charging current "Ic" and discharging current "Id" of the transformer 120 are not influenced by the winding ratio of the transformer 120. Therefore, when a ratio "Id/Ic" of the magnitude of discharging current "Id" to the magnitude charging current "Ic" of the transformer 120 is defined as a current gain, the current gain is one. Meanwhile, although the embodiment shown in FIGS. 6A and 6B shows a case where the primary winding 121 of the transformer 120 is used as an inductor, the secondary winding 122 of the transformer 120 may be used as an inductor by utilizing the auxiliary switch unit Sc1 and Sc2.

Figure 7A:
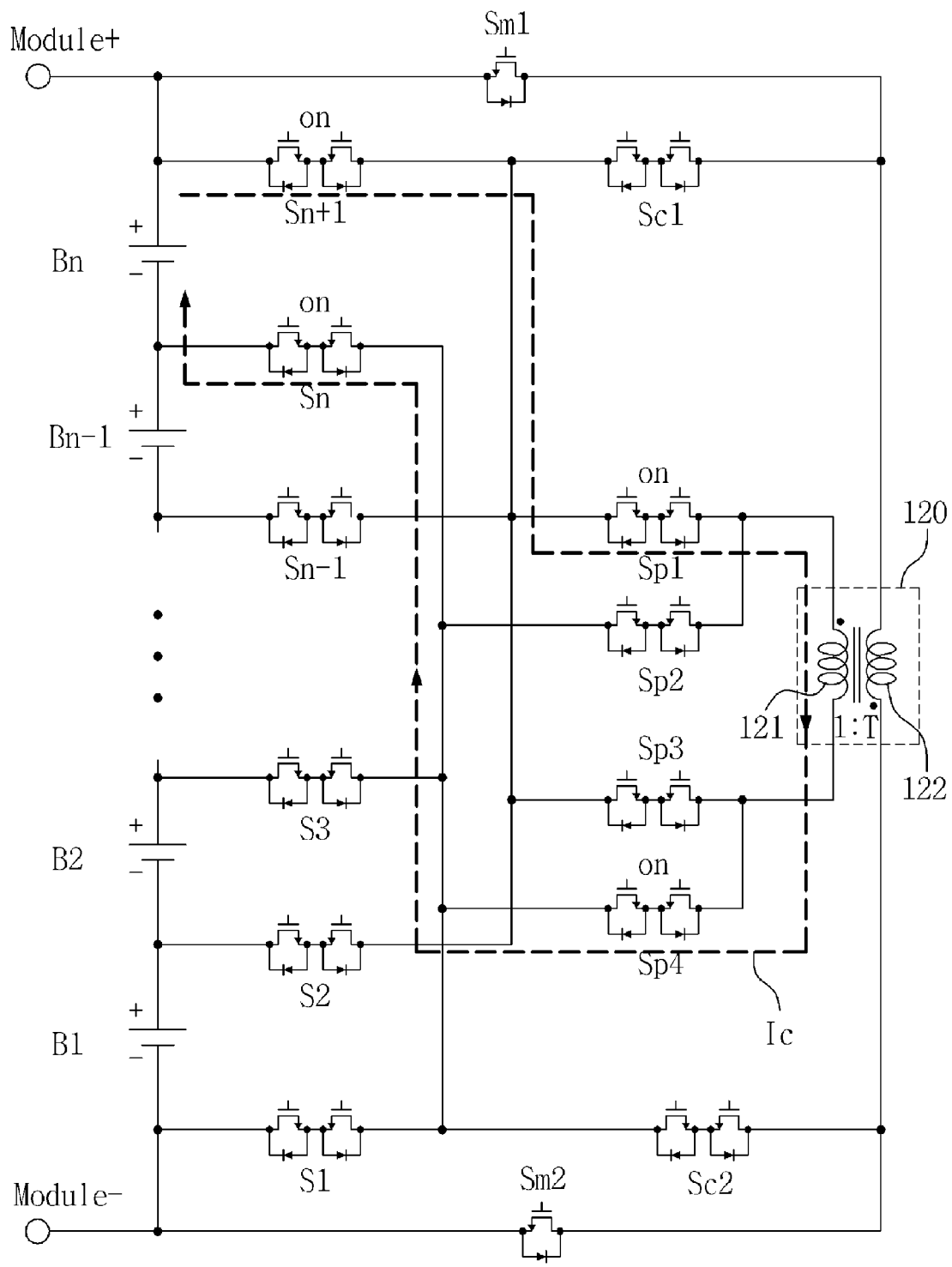
Figure 7B:
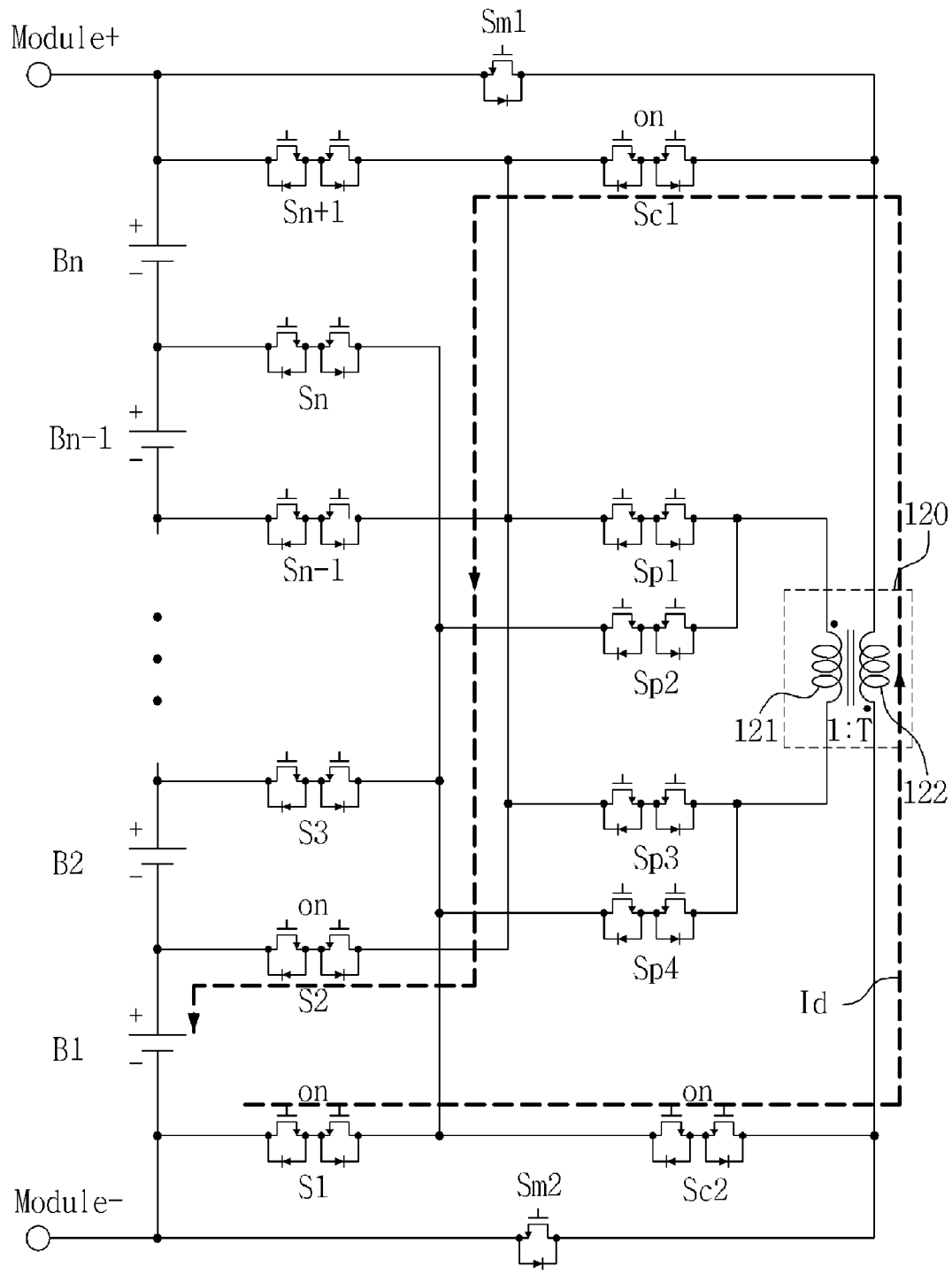

FIGS. 7A and 7B are views explaining another operation mode (i.e. a second cell-to-cell mode) for transferring energy from a cell Bn to a cell B1. Similarly to FIG. 6A, FIG. 7A shows a procedure of storing energy in the transformer 120 while discharging energy of the cell Bn by turning on switches Sn+1, Sp1, Sp4, and Sn. Thereafter, as shown in FIG. 7B, when switches S1, Sc2, Sc1, and S2 are turned on, the energy stored in the transformer 120 is discharged through the secondary winding 122, so that current to charge the cell B1 flows. In the operation mode shown in FIGS. 7A and 7B, the transformer 120 operates as a normal transformer which utilizes magnetic flux coupling between two windings. In addition, in this case, the magnitude of charging current "Ic" to flow through the primary winding 121 of the transformer 120 and to charge the transformer 120, shown in FIG. 7A, and the magnitude of discharging current "Id" to flow through the secondary winding 122 of the transformer 120 and to discharge energy of the transformer 120, shown in FIG. 7B, have a relation of "Id/Ic=1/T" by the winding ratio (1:T) between the primary winding 121 and the secondary winding 122. Thus, a current gain "Id/Ic", which is a ratio of the magnitude of discharging current "Id" of the transformer 120 to the magnitude of charging current "Ic" thereof, is "1/T". That is to say, the operation mode (the second cell-to-cell mode) shown in FIGS. 7A and 7B is the same as the operation mode shown in FIGS. 6A and 6B with respect to energy transference from a cell to another cell, but is different from the operation mode shown in FIGS. 6A and 6B in that the former can obtain a current gain of "1/T" utilizing the winding ratio between the primary winding 121 and secondary winding 122 of the transformer 120.

Figure 8A:
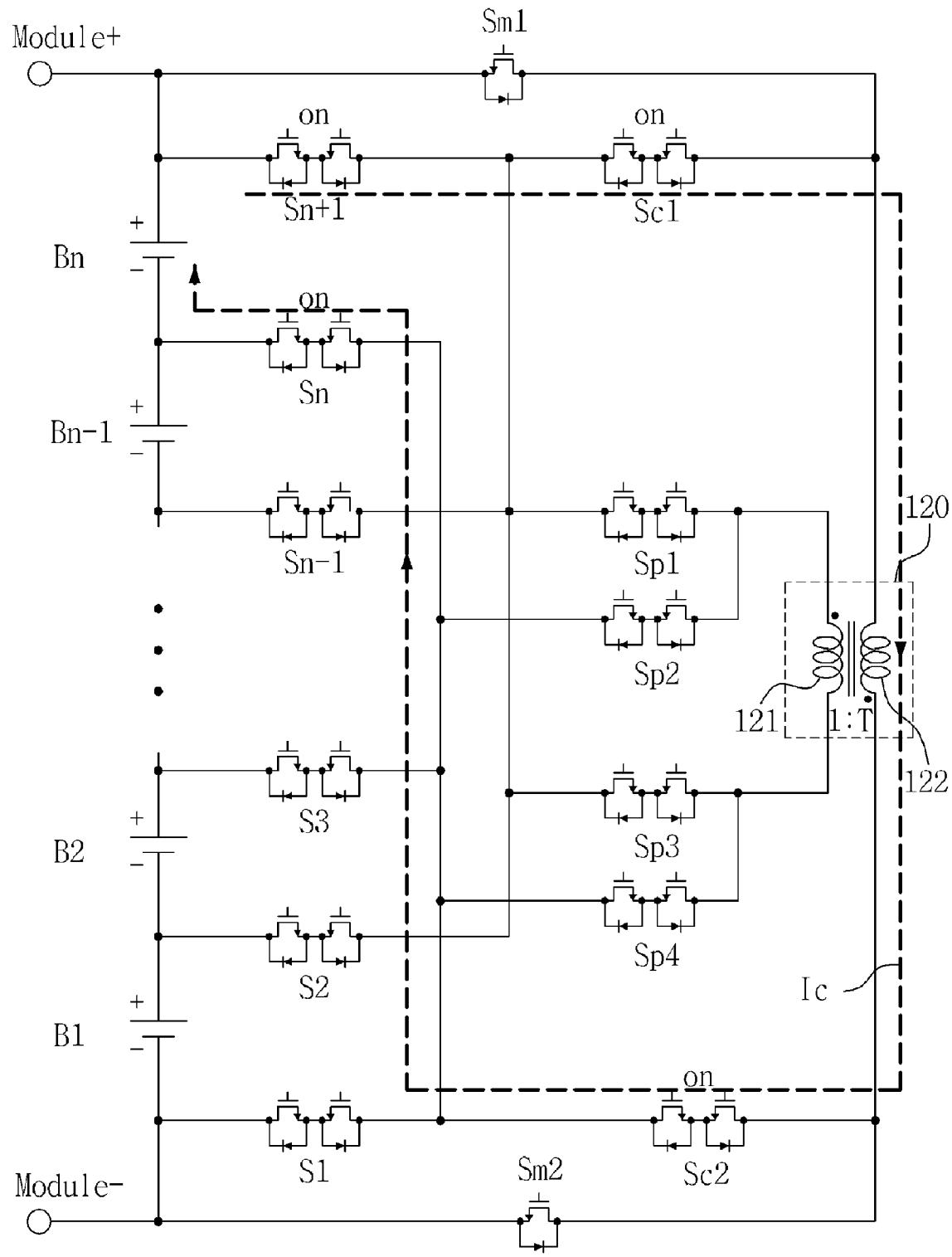
Figure 8B:
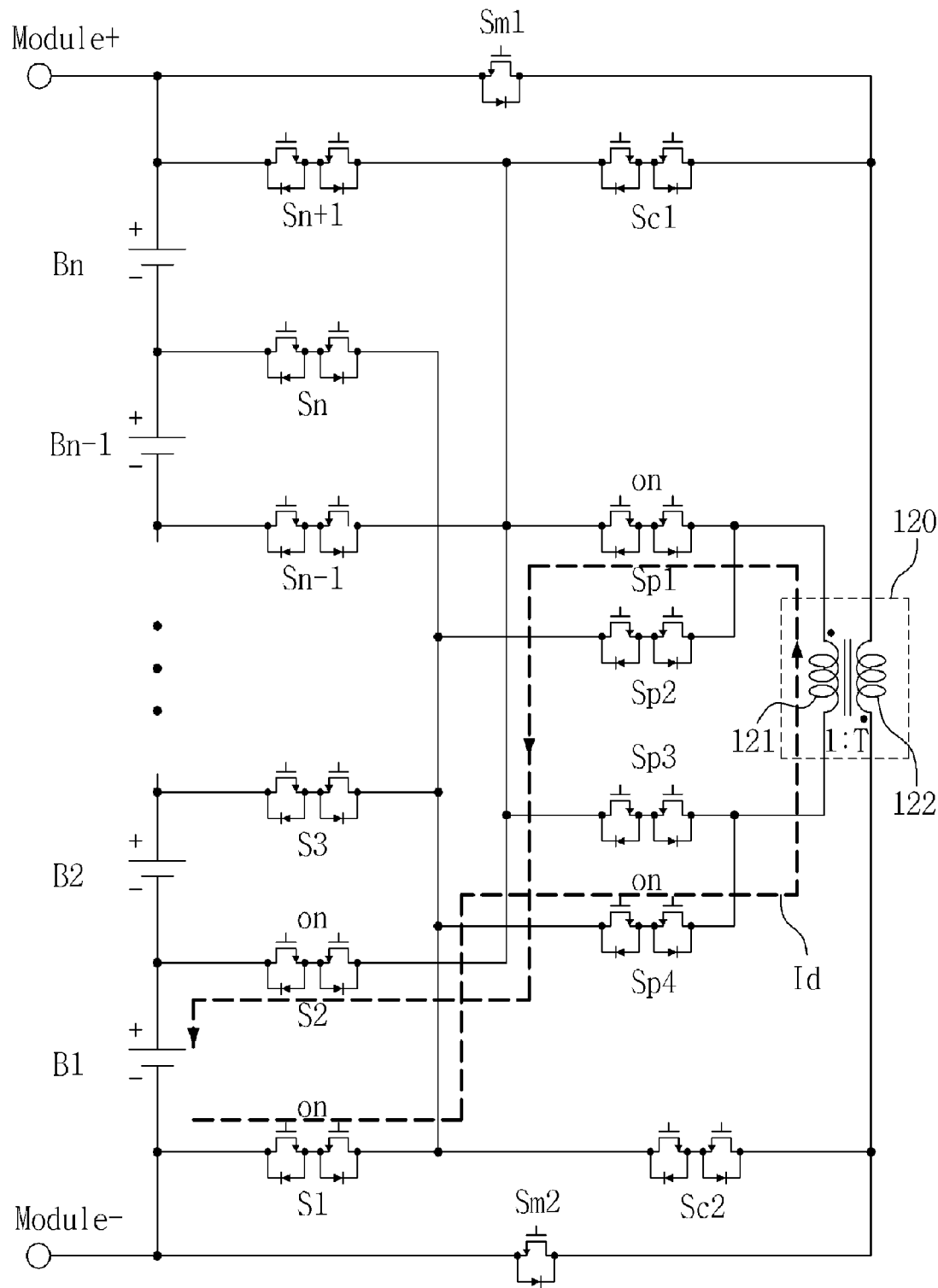

FIGS. 8A and 8B are views explaining still another operation mode (i.e. a third cell-to-cell mode) for transferring energy from a cell Bn to a cell B1. Referring to FIG. 8A, when switches Sn+1, Sc1, Sc2, and Sn are turned on, current flows from the cell Bn to the secondary winding 122 of the transformer 120, so that the cell Bn discharges energy, and the transformer 120 is charged with the energy. Thereafter, when switches S1, Sp4, Sp1, and S2 are turned on, as shown in FIG. 8B, current flows from the primary winding 121 of the transformer 120 in a direction of charging the cell B1, so that the transformer 120 discharges energy, and the cell B1 is charged with the energy. Accordingly, a cell-to-cell mode for performing balancing from the cell Bn to the cell B1 is available. The third cell-to-cell mode shown in FIGS. 8A and 8B is the same as the first and second cell-to-cell modes in that balancing from a cell to another cell is performed, and is different from the first and second cell-to-cell modes in that, in the third cell-to-cell mode, energy is stored through the secondary winding 122 of the transformer 120 and is then discharged through the primary winding 121, and accordingly, in that the current gain "Id/Ic" is "T".

Through FIGS. 6A to 8B, it can be understood that the balancing device of FIG. 5 includes three operation modes of enabling energy transference from a cell to another cell. The three operation modes include: a mode (i.e. first cell-to-cell mode) in which the winding ratio of the transformer 120 is not utilized, but the transformer 120 is used as an inductor, thereby obtaining a current gain of "1"; a mode (i.e. second cell-to-cell mode) in which the winding ratio of the transformer 120 is utilized, thereby obtaining a current gain of "1/T"; and a mode (i.e. third cell-to-cell mode) in which the winding ratio of the transformer 120 is utilized, thereby obtaining a current gain of "T". Thus, since various balancing modes of enabling energy transference from a cell or cells to a cell or cells are provided, an appropriate mode can be selected in accordance with circumstances, in which the balancing is performed, such as the number of cells to be discharged, the number of cells to be charged, and the like, so that the degree of freedom and the efficiency in a balancing algorithm design can increase.

FIGS. 9A to 11B are views explaining a mode (cell-to-module mode) for balancing from a cell to a module.

Figure 9A:
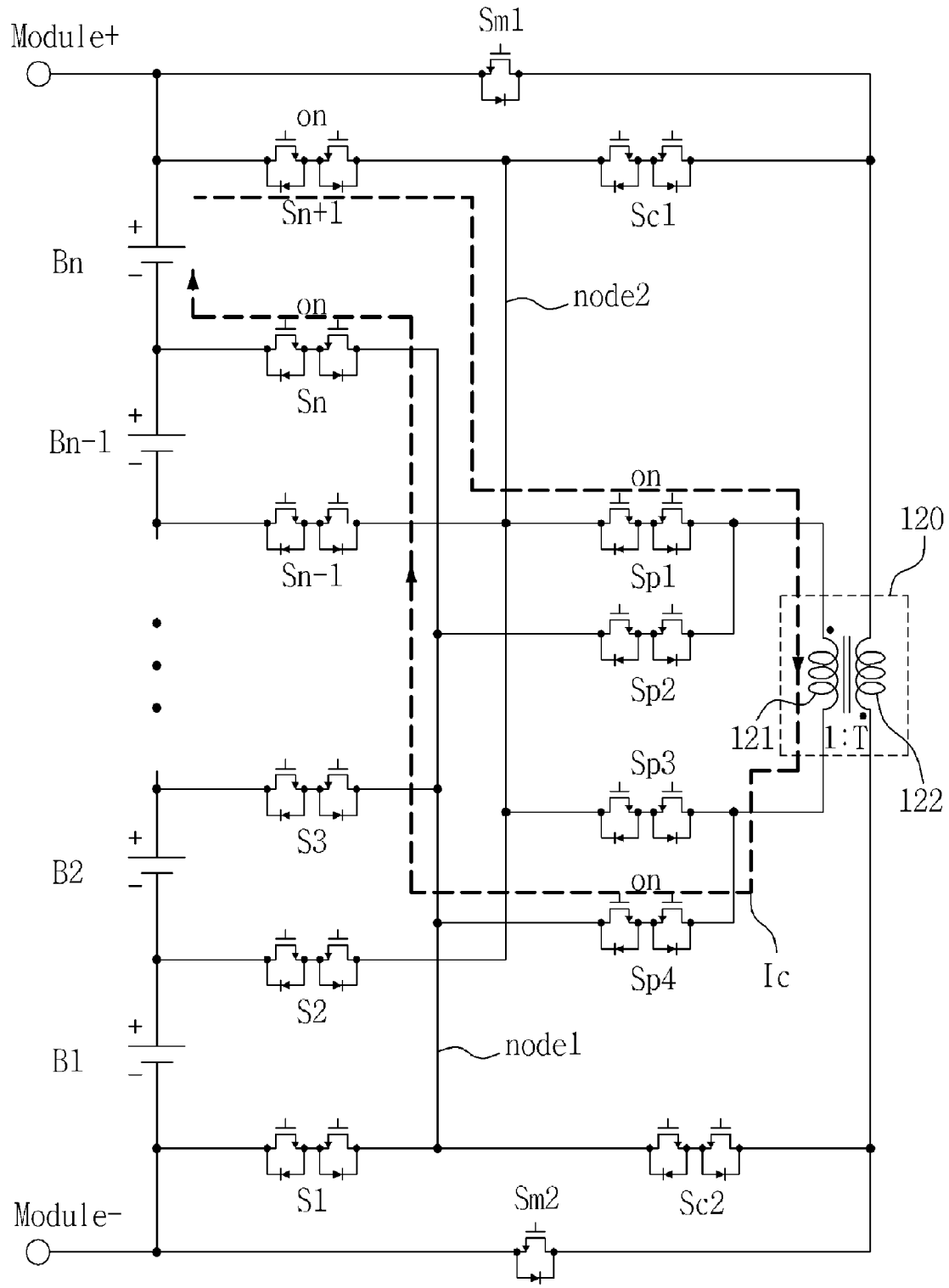
FIGS. 9A to 11B are circuit diagrams explaining a balancing mode from a battery cell to a battery module in the balancing device of FIG. 5.
Figure 9B:
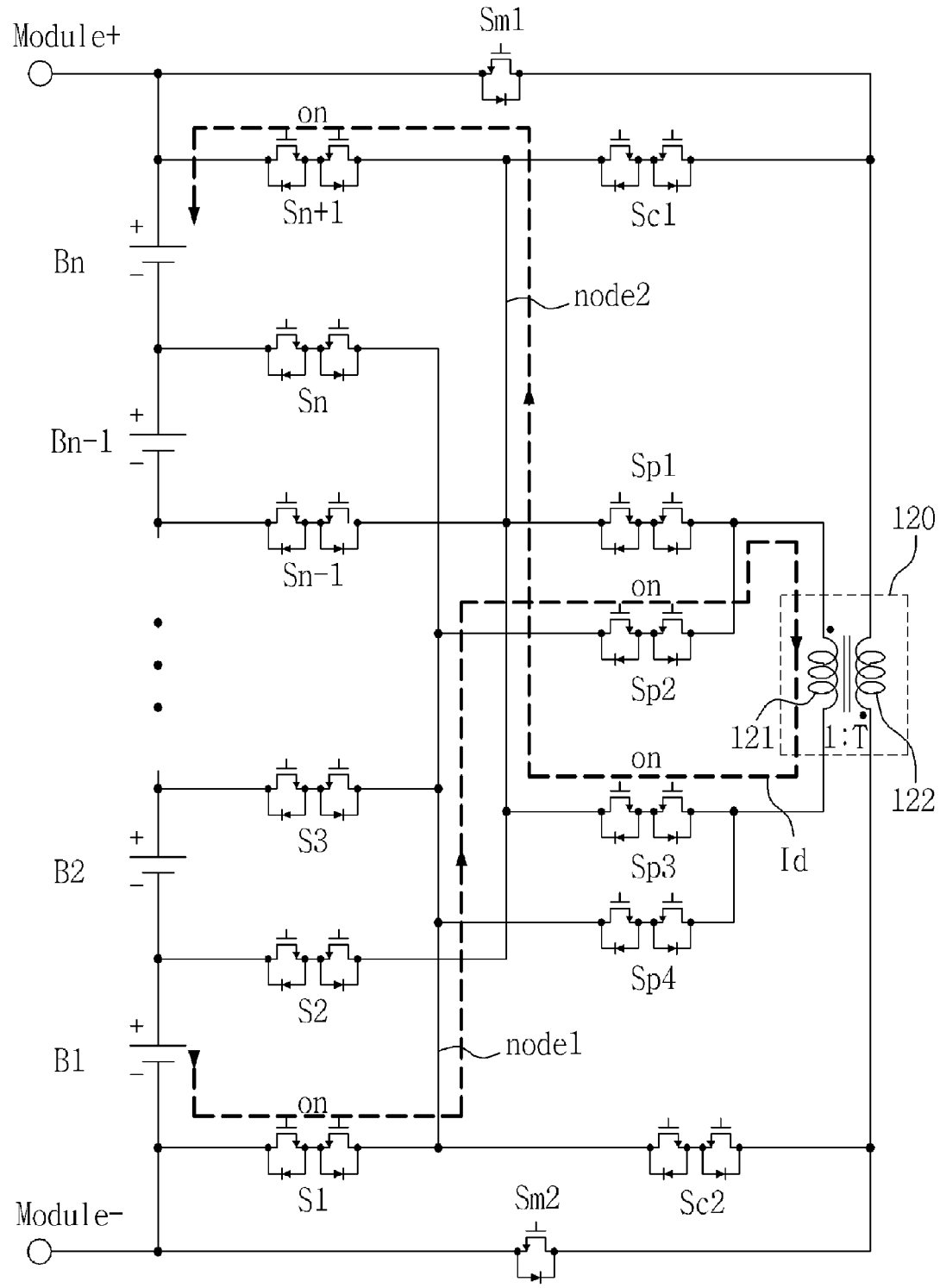

FIGS. 9A and 9B are views explaining a mode (i.e. a first cell-to-module mode) for transferring energy from a cell Bn to the module 110. Referring to FIG. 9A, when switches Sn+1, Sp1, Sp4, and Sn are turned on, current flows from the cell Bn to the primary winding 121 of the transformer 120, so that the cell Bn discharges energy, and the transformer 120 is charged with the energy. Thereafter, when switches Sp3, Sn+1, S1, and Sp2 are turned on, as shown in FIG. 9B, current flows from the primary winding 121 of the transformer 120 to charge the module 110, so that the energy stored in the transformer 120 is discharged, and the battery module 110 is supplied with energy. Accordingly, a balancing operation of transferring energy from a cell to the battery module 110 can be performed. In this operation mode, since the transformer 120 does not use the secondary winding 122, but uses only the primary winding 121 to operate as an inductor, the current gain, which is a ratio of the magnitude of discharging current of the transformer 120 to the magnitude of charging current thereof, is "1", as in the embodiment shown in FIGS. 6A and 6B. Although FIGS. 9A and 9B illustrate a case where the primary winding 121 of the transformer 120 operates as an inductor, the secondary winding 122 of the transformer 120 may be used, as an inductor, by utilizing the auxiliary switch unit 160.

Figure 10A:
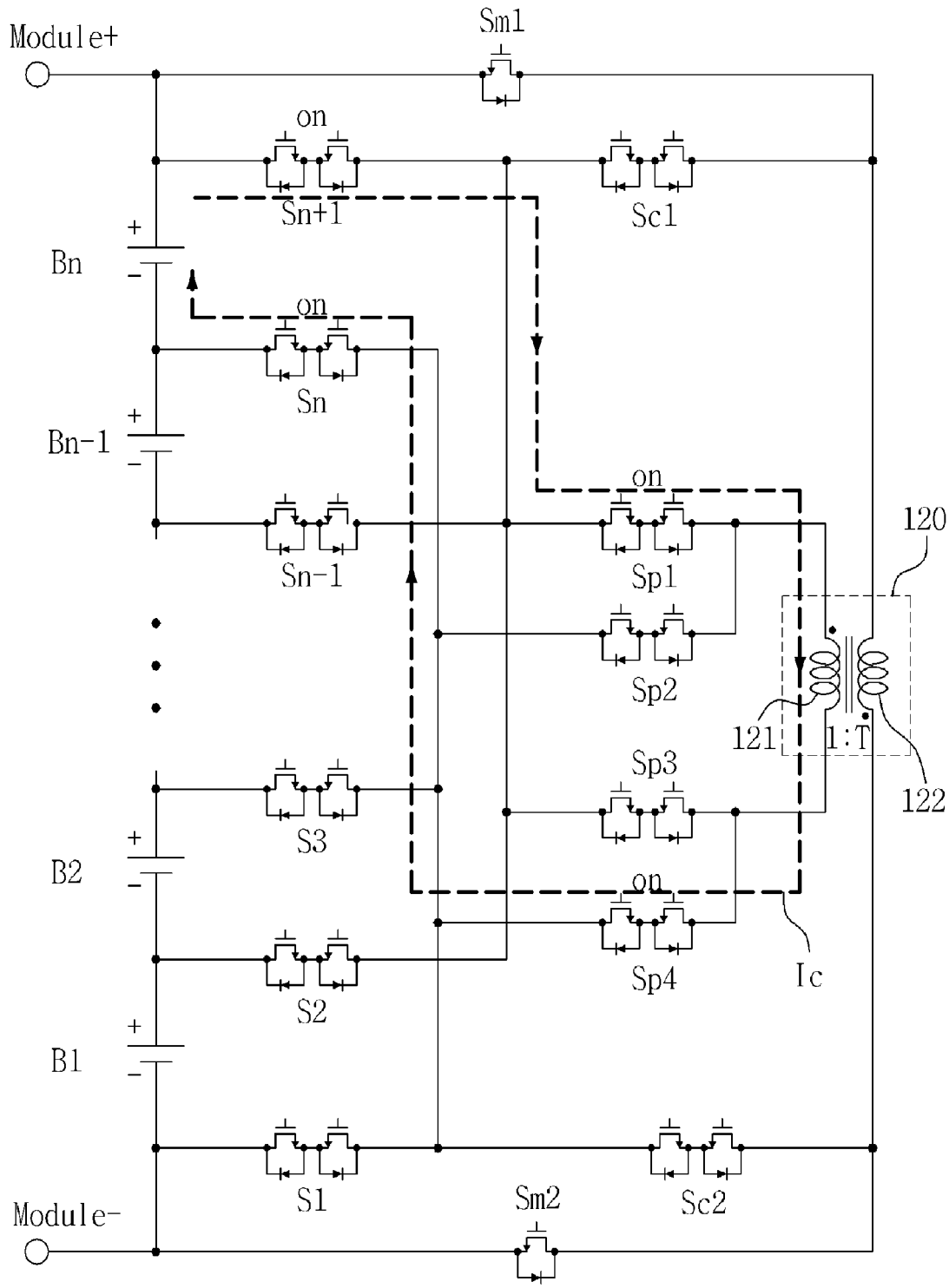
Figure 10B:
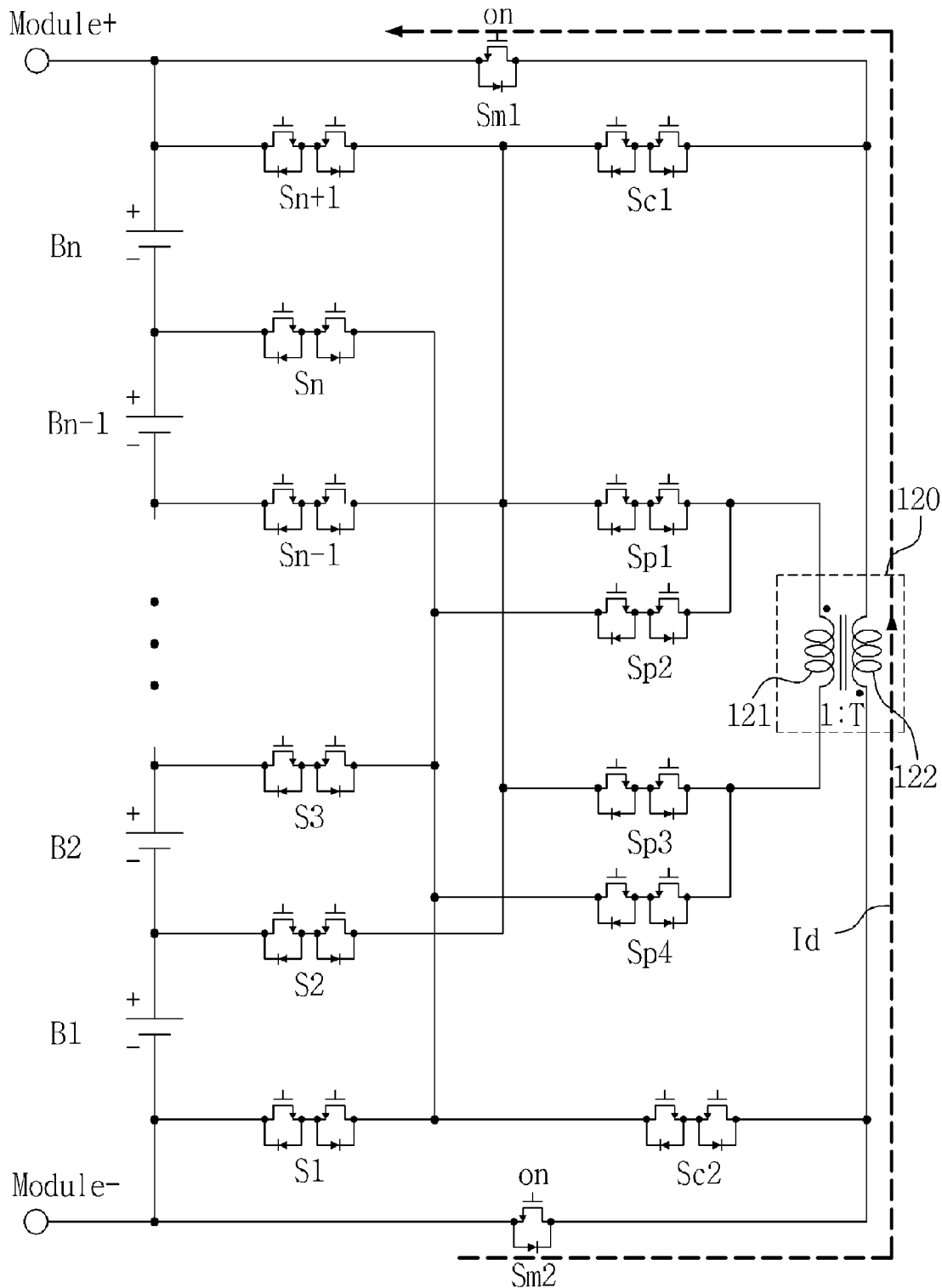

FIGS. 10A and 10B are views explaining another mode (i.e. a second cell-to-module mode) for transferring energy from a cell Bn to the module 110. Referring to FIG. 10A, when switches Sn+1, Sp1, Sp4, and Sn are turned on, current flows from the cell Bn to the primary winding 121 of the transformer 120, so that the cell Bn discharges energy, and the transformer 120 is charged with the energy. Thereafter, when switches Sm1 and Sm2 are turned on, as shown in FIG. 10B, current flows from the secondary winding 122 of the transformer 120 to charge the entire module 110, so that the transformer 120 discharges energy, and the battery module 110 stores energy. Accordingly, a balancing operation from a cell to the battery module 110 can be performed. Since energy is stored through the primary winding 121 of the transformer 120 and then the energy of the transformer 120 is discharged through the secondary winding 122, the current gain "Id/Ic", which is a ratio of the magnitude of discharging current of the transformer 120 to the magnitude of charging current thereof, is "1/T", as in the embodiment shown in FIGS. 7A and 7B.

Figure 11A:
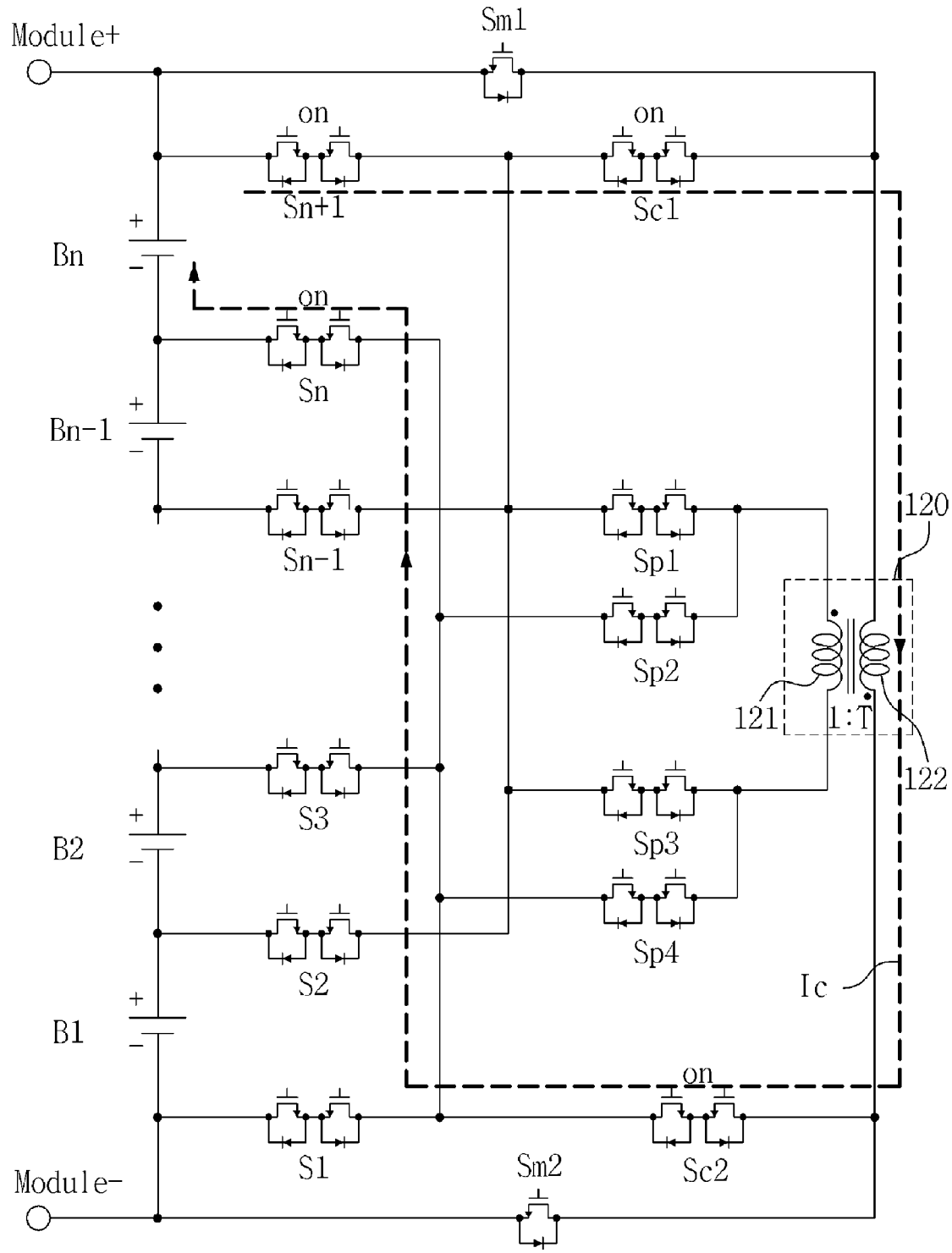
Figure 11B:
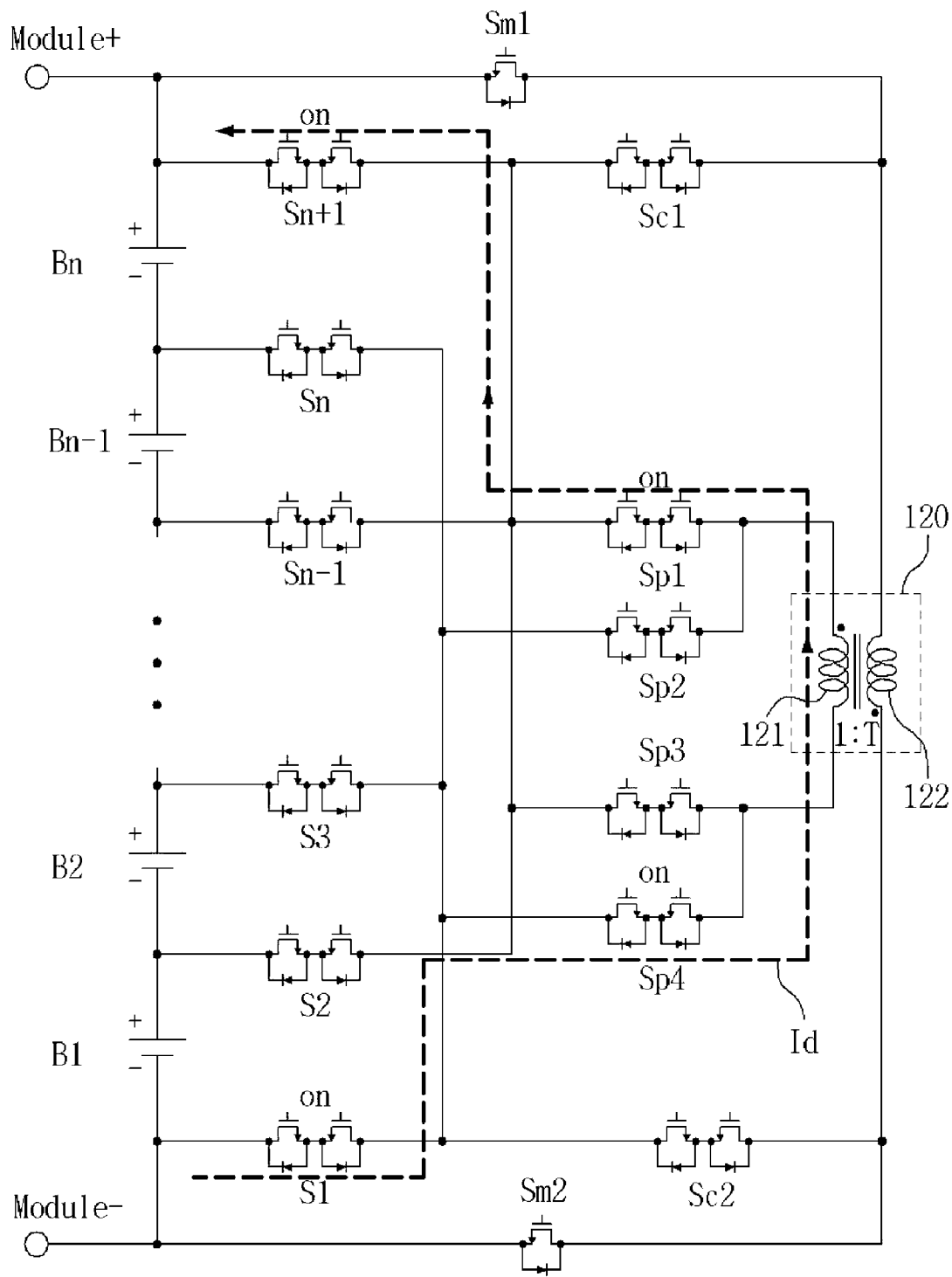

FIGS. 11A and 11B are views explaining still another mode (i.e. a third cell-to-module mode) for transferring energy from a cell Bn to the module 110. Referring to FIG. 11A, when switches Sn+1, Sc1, Sc2, and Sn are turned on, current flows from the cell Bn to the secondary winding 122 of the transformer 120, so that the cell Bn discharges energy, and the transformer 120 is charged with the energy. Thereafter, when switches Sp1, Sn+1, S1, and Sp4 are turned on, as shown in FIG. 11B, current flows from the primary winding 121 of the transformer 120 to the battery module 110, so that the energy stored in the transformer 120 is discharged, and the battery module 110 is supplied with energy. Accordingly, a balancing operation for transferring energy from a cell to the battery module 110 can be performed. Since energy is stored in the transformer 120 through the secondary winding 122 of the transformer 120 and then the energy of the transformer 120 is discharged through the primary winding 121, the current gain "Id/Ic", which is a ratio of the magnitude of discharging current of the transformer 120 to the magnitude of charging current thereof, is "T", as in the embodiment shown in FIGS. 8A and 8B.

Through FIGS. 9A to 11B, it can be understood that the balancing device of FIG. 5 can achieve three operation modes of enabling energy transference from a cell to the module. The three operation modes include: a mode (i.e. first cell-to-module mode) in which the winding ratio of the transformer 120 is not utilized, but the transformer 120 is used as an inductor, thereby obtaining a current gain of "1"; a mode (i.e. second cell-to-module mode) in which the winding ratio of the transformer 120 is utilized, thereby obtaining a current gain of "1/T"; and a mode (i.e. third cell-to-module mode) in which the winding ratio of the transformer 120 is utilized, thereby obtaining a current gain of "T". Thus, since various balancing modes of enabling energy transference from a cell or cells to a module are provided, an appropriate mode can be selected in accordance with circumstances, in which the balancing is performed, such as the number of cells to be discharged, the number of cells included in the module 110, and the like, so that the degree of freedom and the efficiency in a balancing algorithm design can increase.

FIGS. 12A to 14B are circuit diagrams explaining a balancing mode (i.e. module-to-cell mode) from the battery module 110 to a cell.

Figure 12A:
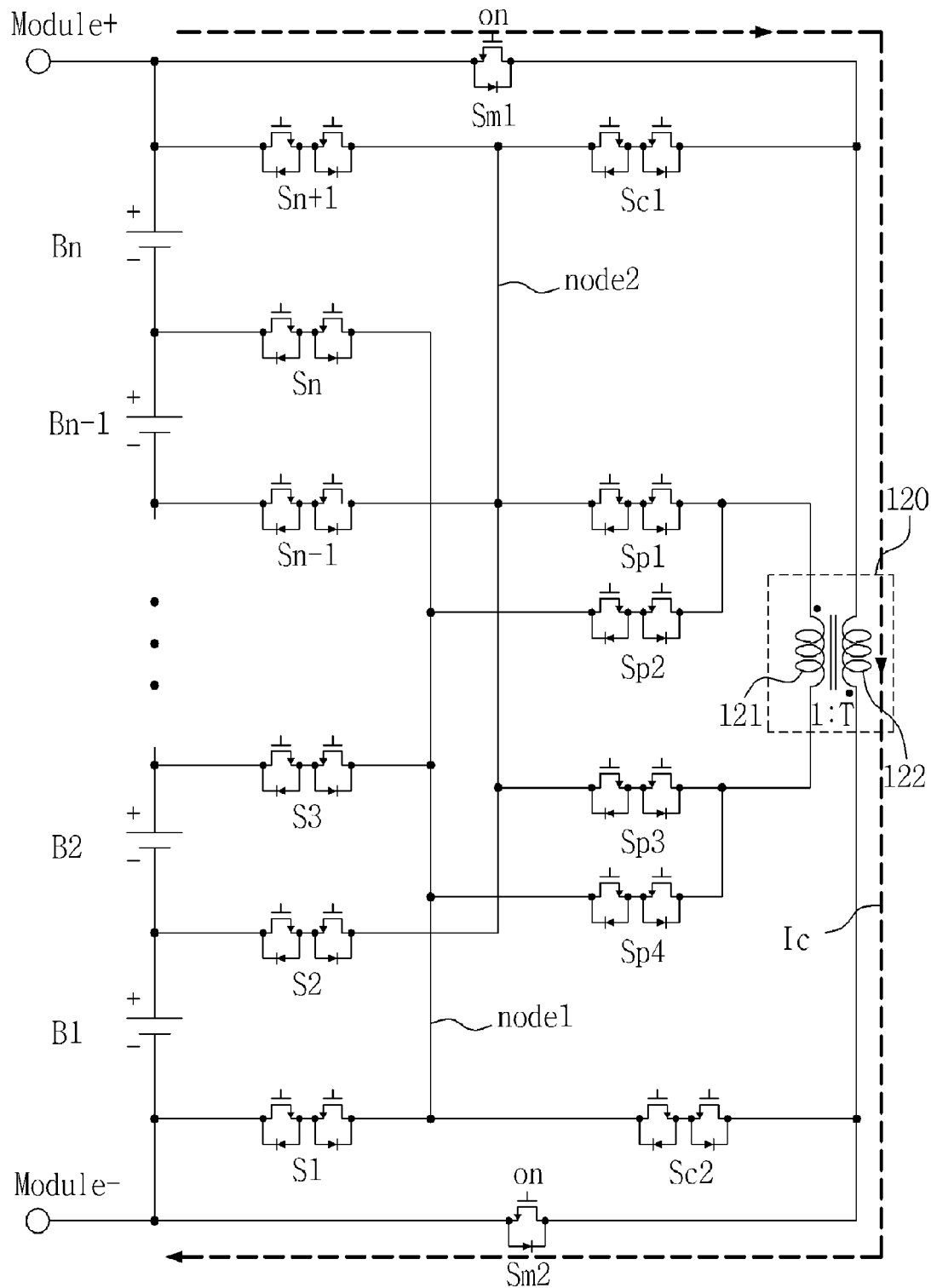
FIGS. 12A to 14B are circuit diagrams explaining a balancing mode from a battery module to a battery cell in the balancing device of FIG. 5.
Figure 12B:
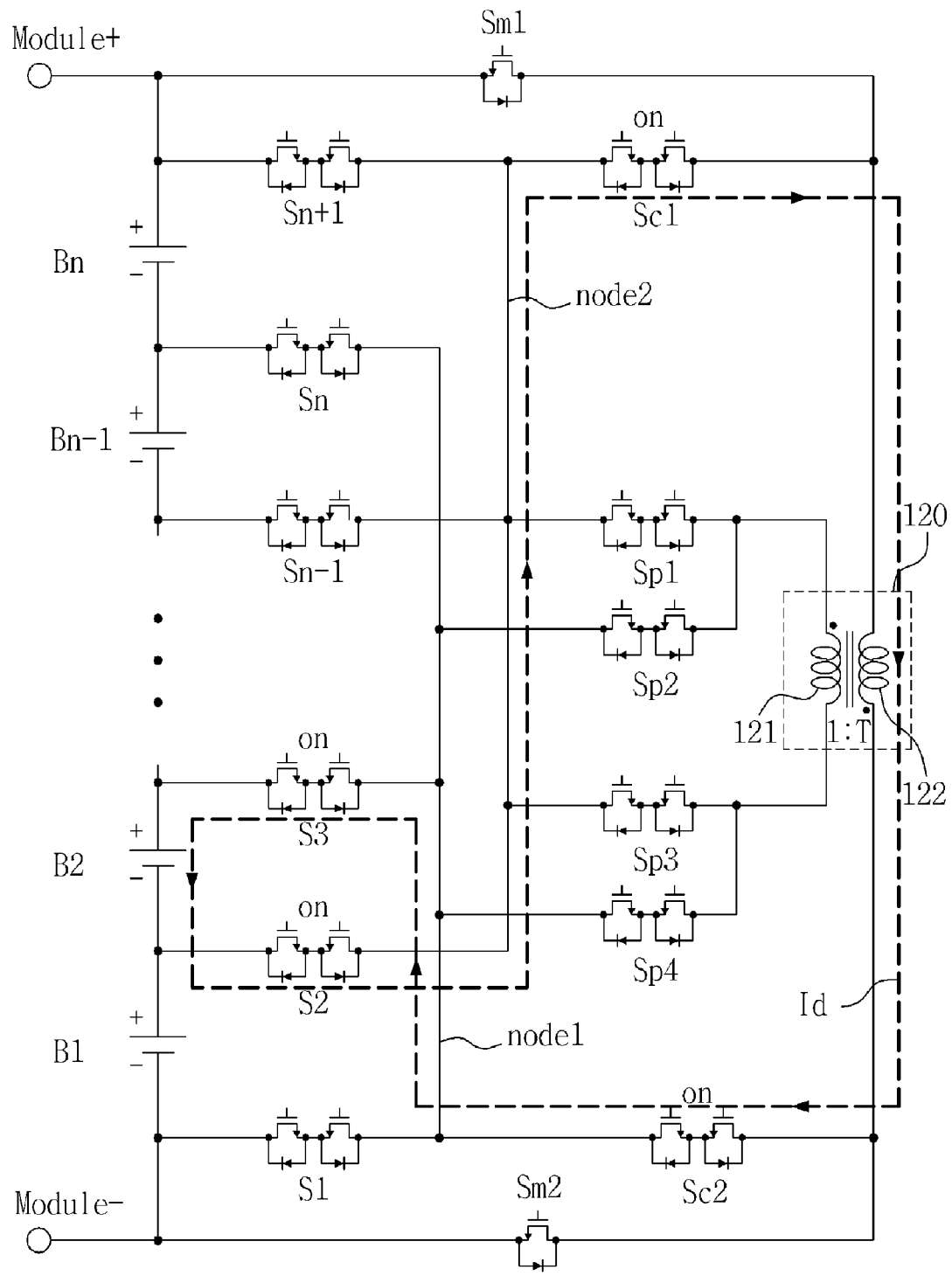

FIGS. 12A and 12B are views explaining a mode (i.e. a first module-to-cell mode) for transferring energy from the module 110 to a cell Bn. Referring to FIG. 12A, when switches Sm1 and Sm2 are turned on, current flows from the module 110 to the secondary winding 122 of the transformer 120, so that the module 110 discharges energy, and the transformer 120 stores the energy. Thereafter, when switches Sc2, S3, S2, and Sc1 are turned on, as shown in FIG. 12B, current flows from the secondary winding 122 of the transformer 120 to the cell Bn, so that the energy stored in the transformer 120 is discharged, and the cell Bn is supplied with energy. Accordingly, a balancing operation for transferring energy from the module 110 to a cell can be performed. In this operation mode, since the transformer 120 utilizes only the secondary winding 122 thereof to operate as an inductor, the current gain, which is a ratio of the magnitude of discharging current of the transformer 120 to the magnitude of charging current thereof, is "1", as in the embodiment shown in FIGS. 6A and 6B. Although FIGS. 12A and 12B illustrate a case where the transformer 120 does not use the primary winding 121 and operates as an inductor through the secondary winding 122, the primary winding 121 of the transformer 120 may be used, as an inductor, by utilizing the cell switch unit 130 and the polarity switch unit 140.

Figure 13A:
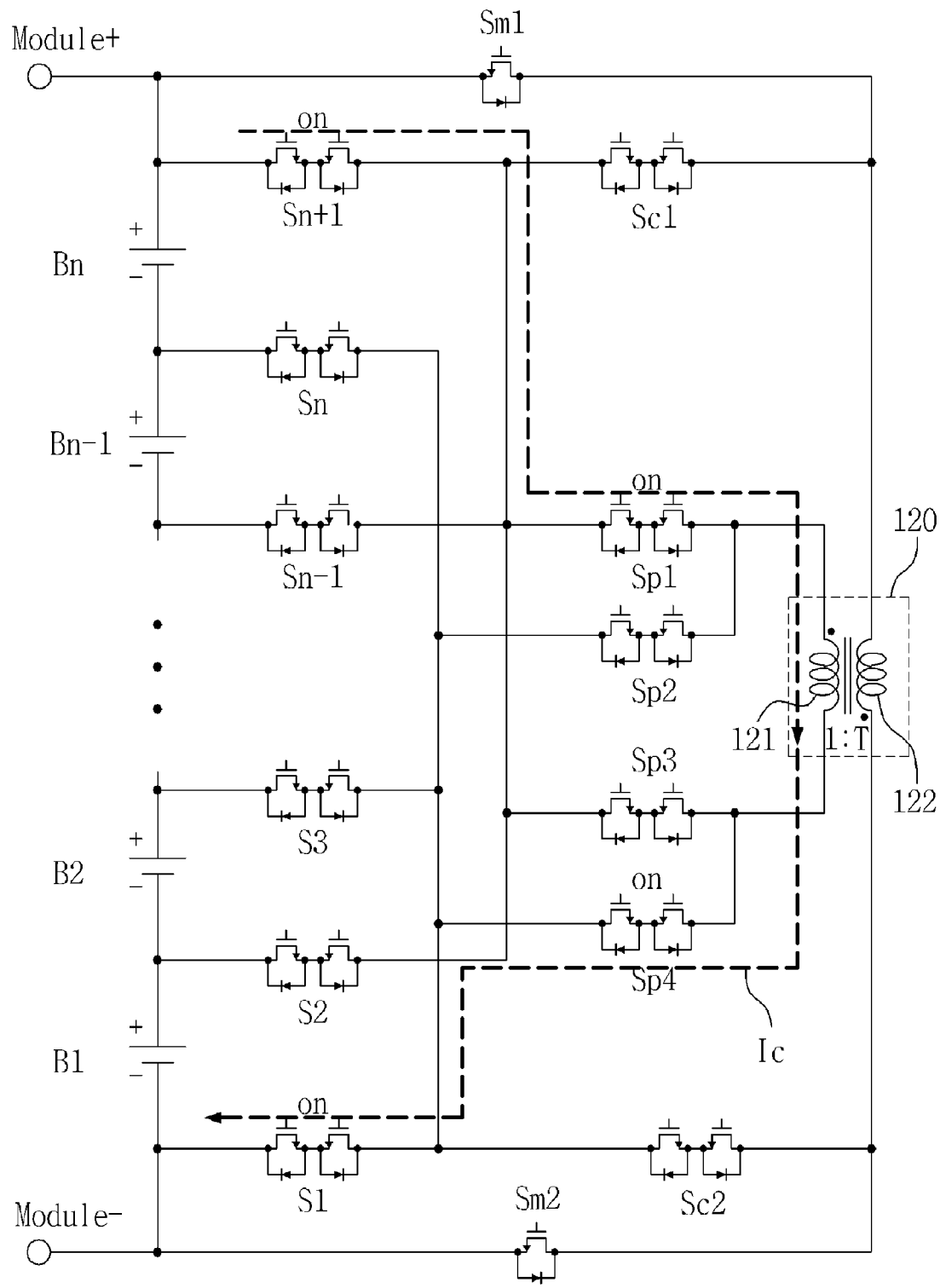
Figure 13B:
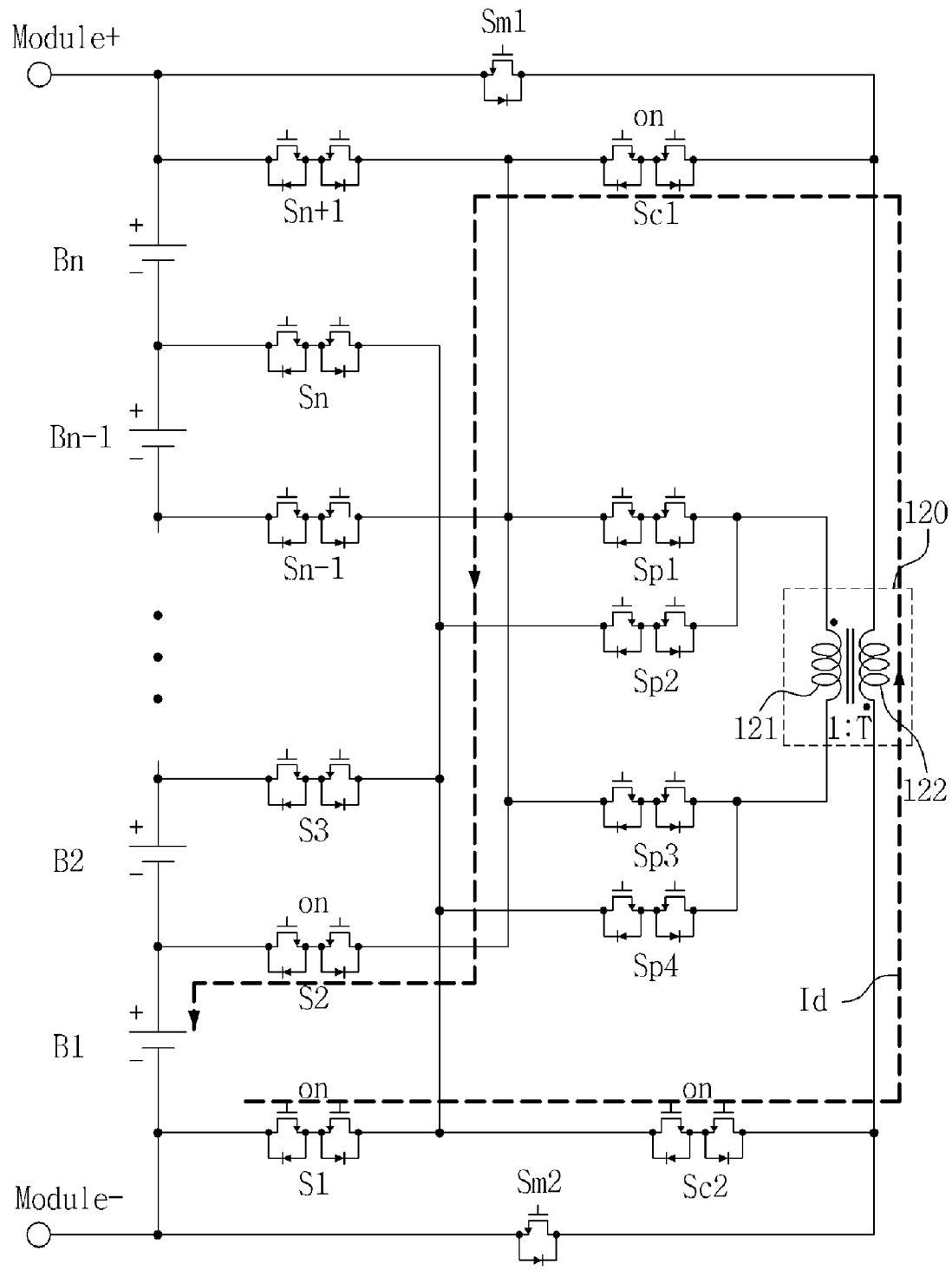

FIGS. 13A and 13B are views explaining another mode (i.e. a second module-to-cell mode) for transferring energy from the module 110 to a cell Bn. Referring to FIG. 13A, when switches Sn+1, Sp1, Sp4, and S1 are turned on, current flows from the module 110 to the primary winding 121 of the transformer 120, so that the module 110 discharges energy, and the transformer 120 stores the energy. Thereafter, when switches Sc1, S2, S1, and Sc2 are turned on, as shown in FIG. 13B, current flows from the secondary winding 122 of the transformer 120 to charge the cell B1, so that the transformer 120 discharges energy, and the cell B1 is supplied with energy. Accordingly, a balancing operation for transferring energy from the module 110 to a cell can be performed. Since energy is stored through the primary winding 121 of the transformer 120 and then the energy of the transformer 120 is discharged through the secondary winding 122 thereof, the current gain "Id/Ic", which is a ratio of the magnitude of discharging current "Id" of the transformer 120 to the magnitude of charging current "Ic" thereof, is "1/T", as in the embodiment shown in FIGS. 7A and 7B.

Figure 14A:
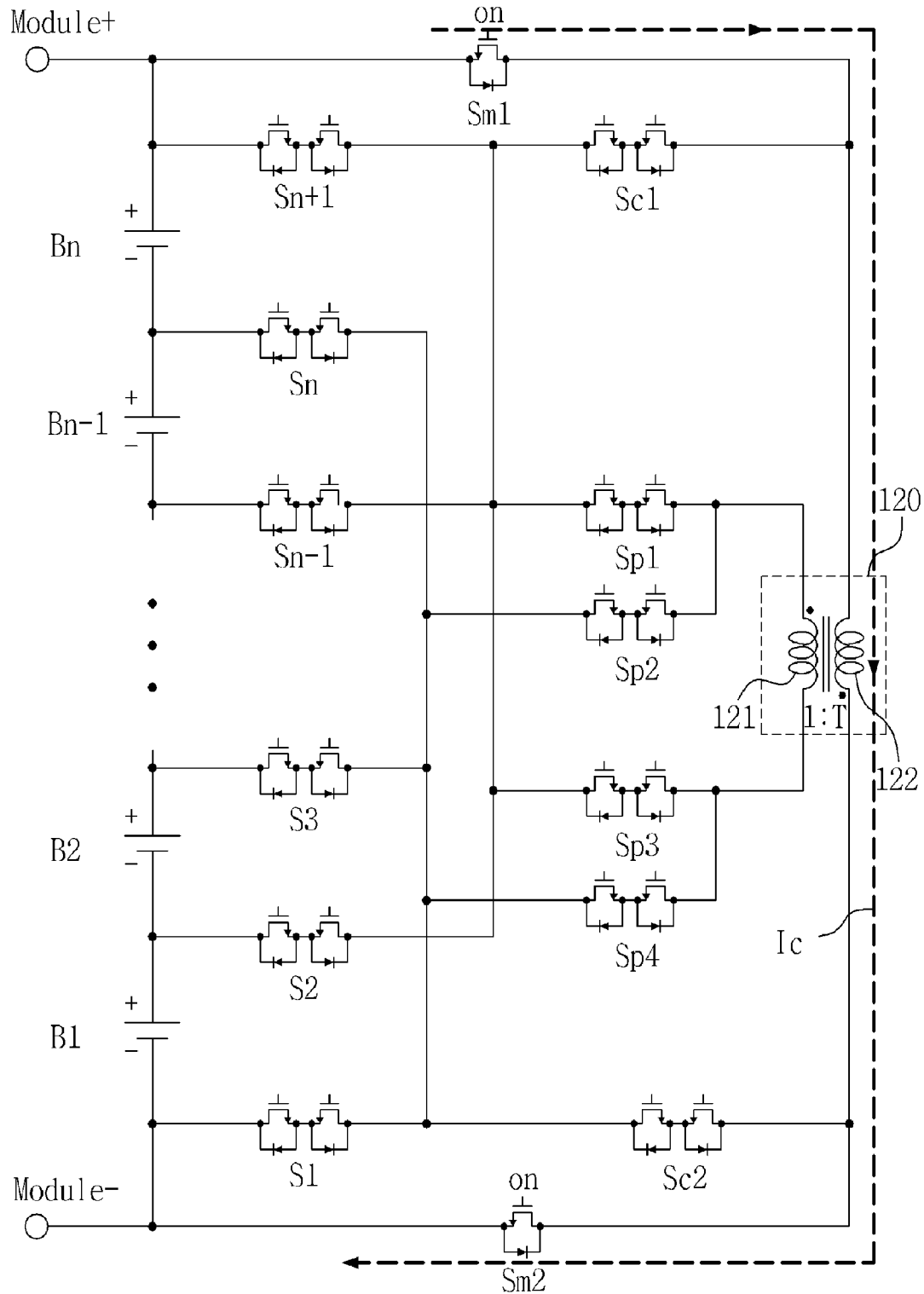
Figure 14B:
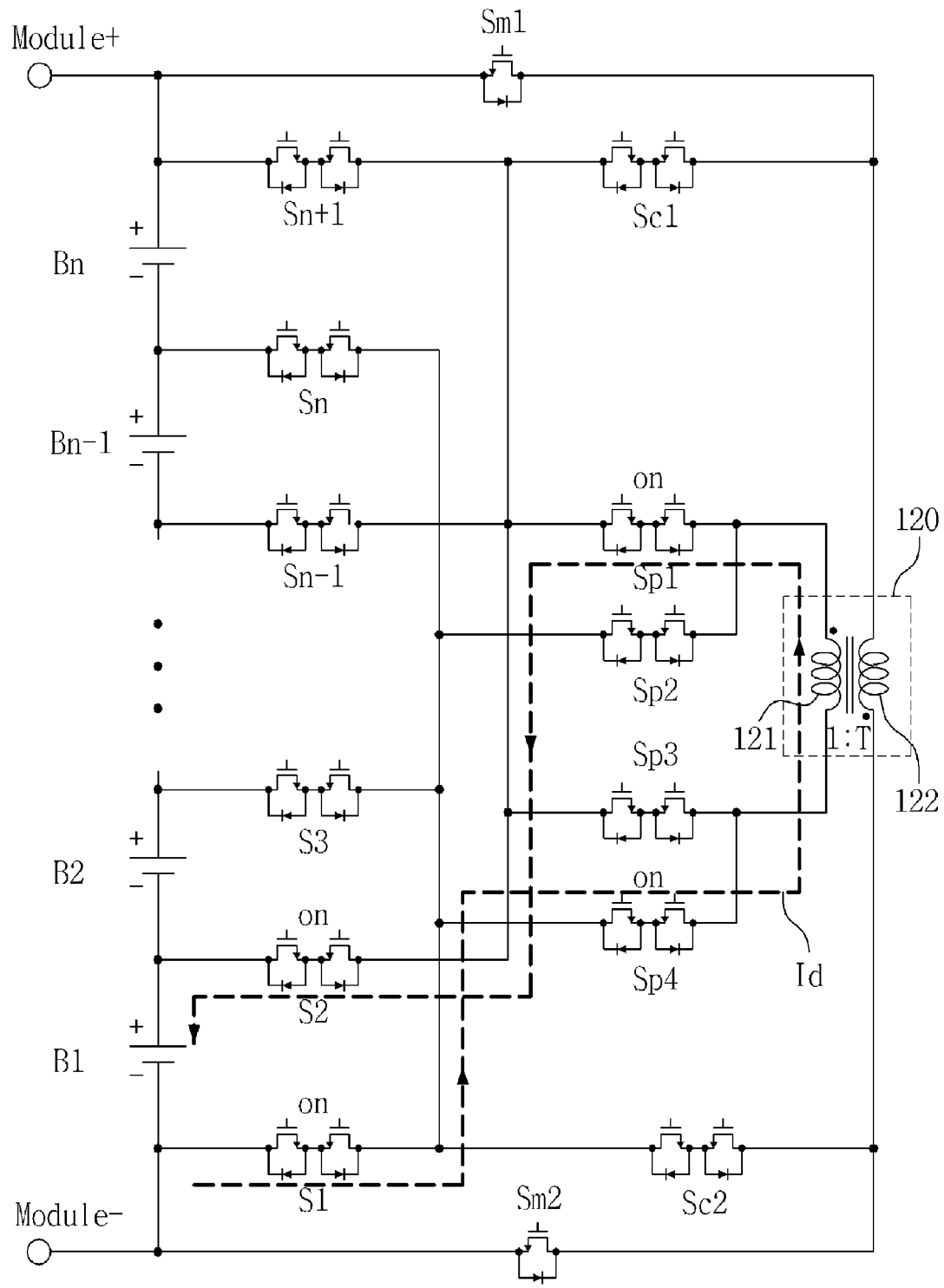

FIGS. 14A and 14B are views explaining still another mode (i.e. a third module-to-cell mode) for transferring energy from the module 110 to a cell Bn. Referring to FIG. 14A, when switches Sm1 and Sm2 are turned on, current flows from the module 110 to the secondary winding 122 of the transformer 120, so that the module 110 discharges energy, and the transformer 120 stores the energy. Thereafter, when switches Sp1, S2, S1, and Sp4 are turned on, as shown in FIG. 14B, current flows from the primary winding 121 of the transformer 120 to the cell B1, so that the energy stored in the transformer 120 is discharged, and the cell B1 is supplied with the energy. Accordingly, a balancing operation for transferring energy from the module 110 to a cell can be performed. Since energy is stored in the transformer 120 through the secondary winding 122 of the transformer 120 and then the energy of the transformer 120 is discharged through the primary winding 121 thereof, the current gain "Id/Ic", which is a ratio of the magnitude of discharging current "Id" of the transformer 120 to the magnitude of charging current "Ic" thereof, is "T", as in the embodiment shown in FIGS. 8A and 8B.

Through FIGS. 12A and 14B, it can be understood that the balancing device of FIG. 5 can achieve three operation modes of enabling energy transference from the module 110 to a cell. The three operation modes include: a mode (i.e. first module-to-cell mode) in which the winding ratio of the transformer 120 is not utilized, but the transformer 120 is used as an inductor, thereby obtaining a current gain of "1"; a mode (i.e. second module-to-cell mode) in which the winding ratio of the transformer 120 is utilized, thereby obtaining a current gain of "1/T"; and a mode (i.e. third module-to-cell mode) in which the winding ratio of the transformer 120 is utilized, thereby obtaining a current gain of "T". Thus, since various balancing modes of enabling energy transference from the module 110 to a cell or cells are provided, an appropriate mode can be selected in accordance with circumstances, in which the balancing is performed, such as the number of cells included in the module 110, the number of cells to be charged, and the like, so that the degree of freedom and the efficiency in a balancing algorithm design can increase.

Although the above embodiments are illustrated on the cases where energy is charged or discharged with respect to one cell, the charging and discharging of energy can be achieved with respect to a plurality of cells even in any one of the cell-to-cell, cell-to-module, and module-to-cell modes by appropriate on/off operations of the switches.

According to the balancing device of FIG. 5 in accordance with the embodiments of the present invention, various balancing modes from a cell or cells to a cell or cells, from a cell or cells to a module, and from a module to a cell or cells can be achieved even using a smaller number of switches than in the prior art. In addition, even in each balancing mode, it is possible to achieve: an inductor mode in which there is no effect by the winding ratio of the transformer 120, and the transformer 120 operates as an inductor; and a transformer mode in which the winding ratio of the transformer 120 is utilized. In addition, in the transformer mode, a current gain "1/T" inversely proportional to the winding ratio of the transformer 120 and a current gain "T" proportional to the winding ratio of the transformer 120 can be selectively used according to necessity. Therefore, through the balancing device of FIG. 5 in accordance with the embodiments of the present invention, an effective balancing function can be achieved at a low manufacturing cost.

Figure 15:
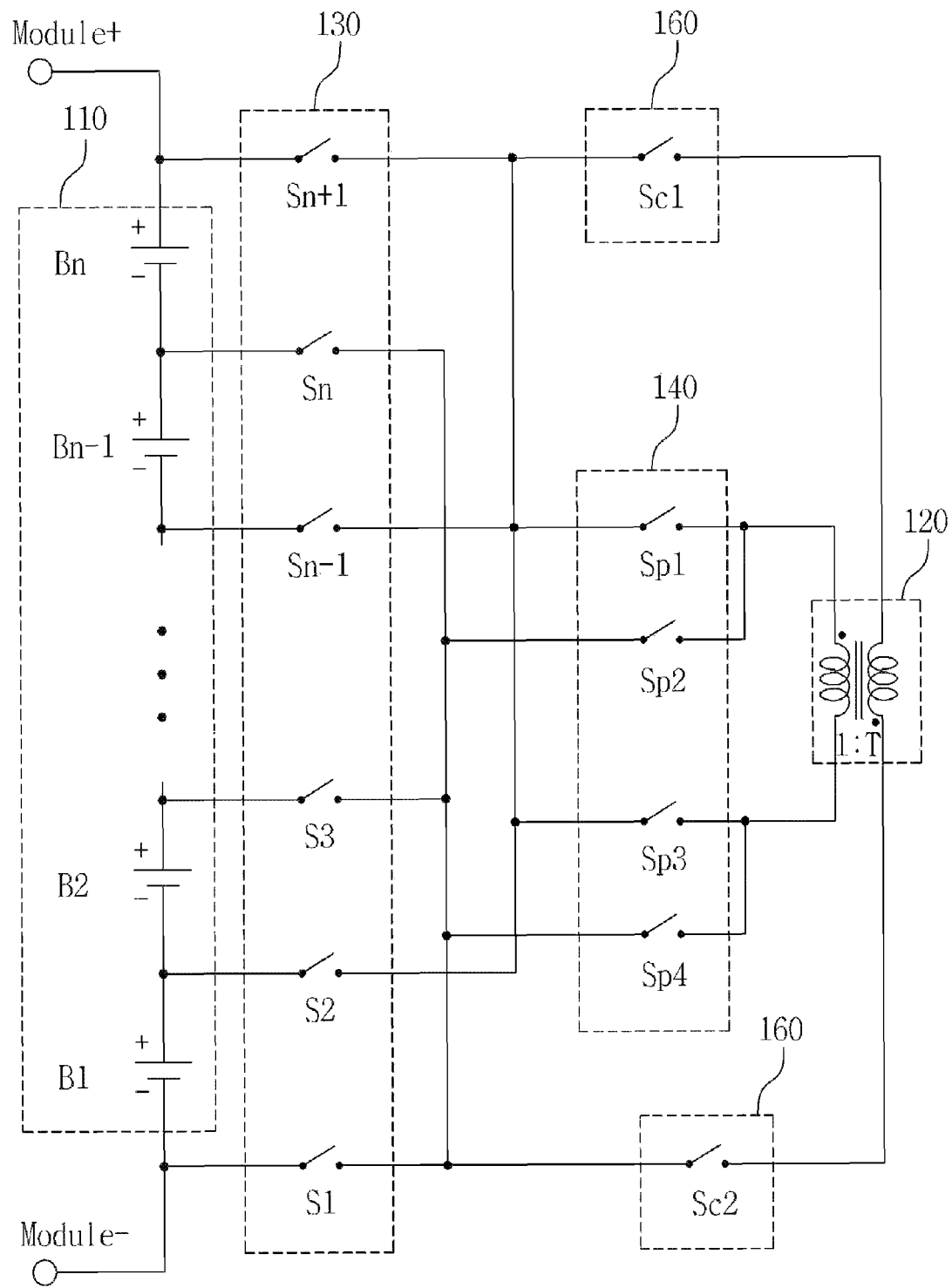
FIG. 15 is a circuit diagram illustrating the configuration of a balancing device modified from the balancing device of FIG. 5 in accordance with another embodiment of the present invention.

FIG. 15 illustrates the configuration of a balancing device modified from the balancing device of FIG. 5 in accordance with an embodiment of the present invention. The balancing device shown in FIG. 15 in accordance with an embodiment of the present invention is different from the balancing device shown in FIG. 5 in that the former does not use the module switch unit 150. The switch Sm1 of the module switch unit 150 functions to connect the "+" terminal of the module 110 with one terminal of the secondary winding 122 of the transformer 120, and the function of the switch Sm1 can be substituted by the switches Sn+1 and Sc1. When the switch Sm1 of the module switch unit 150 is used, current flows through one switch, so that loss is reduced as compared with the case where current flows through two switches Sn+1 and Sc1. However, when the number of switches is a burden, the switch Sm1 may be removed. Similarly, the switch Sm2 of the module switch unit 150 may also be substituted by the switches S1 and Sc2, and it can be determined whether or not the switch Sm2 is to be used by taking the number of switches and loss into consideration. The balancing device shown in FIG. 15 in accordance with an embodiment of the present invention can operate in all the modes in which the balancing device shown in FIG. 5 in accordance with an embodiment of the present invention can operate. Thus, the balancing device shown in FIG. 15 can perform an effective balancing function even using a small number of switches.

Figure 16:
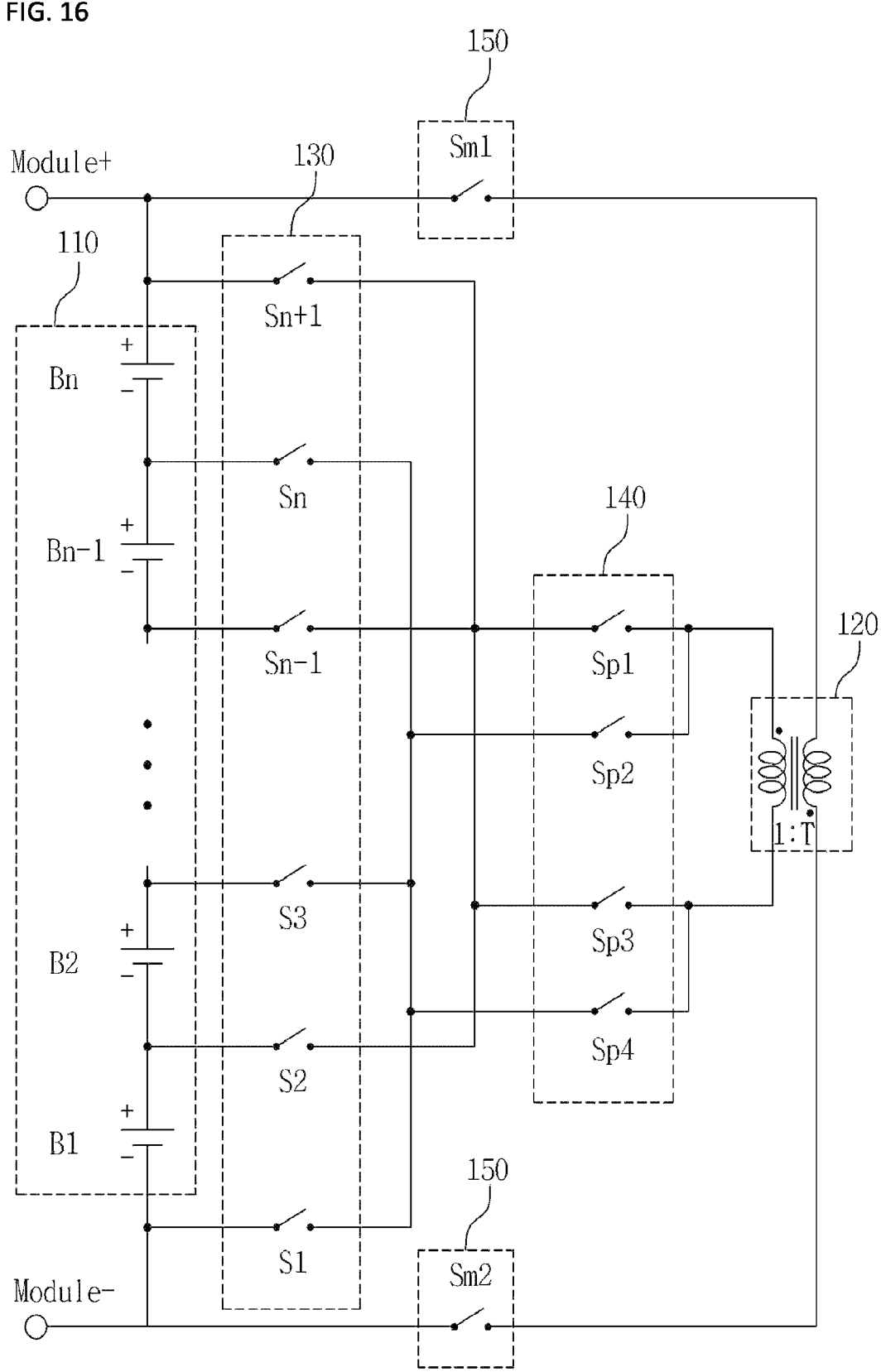
FIG. 16 is a circuit diagram illustrating the configuration of a balancing device modified from the balancing device of FIG. 5 in accordance with still another embodiment of the present invention.

FIG. 16 illustrates the configuration of a balancing device modified from the balancing device of FIG. 5 in accordance with another embodiment of the present invention. The balancing device shown in FIG. 16 in accordance with another embodiment of the present invention is different from the balancing device shown in FIG. 5 in that the former does not use the auxiliary switch unit 160. According to the embodiment shown in FIG. 16, a part of balancing operation modes using the auxiliary switch unit 160 cannot be utilized in the embodiment shown in FIG. 16, but the number of switches can be reduced. Therefore, when the price or size due to the number of switches is a burden, the embodiment shown in FIG. 16 may be an alternative.

Figure 17:
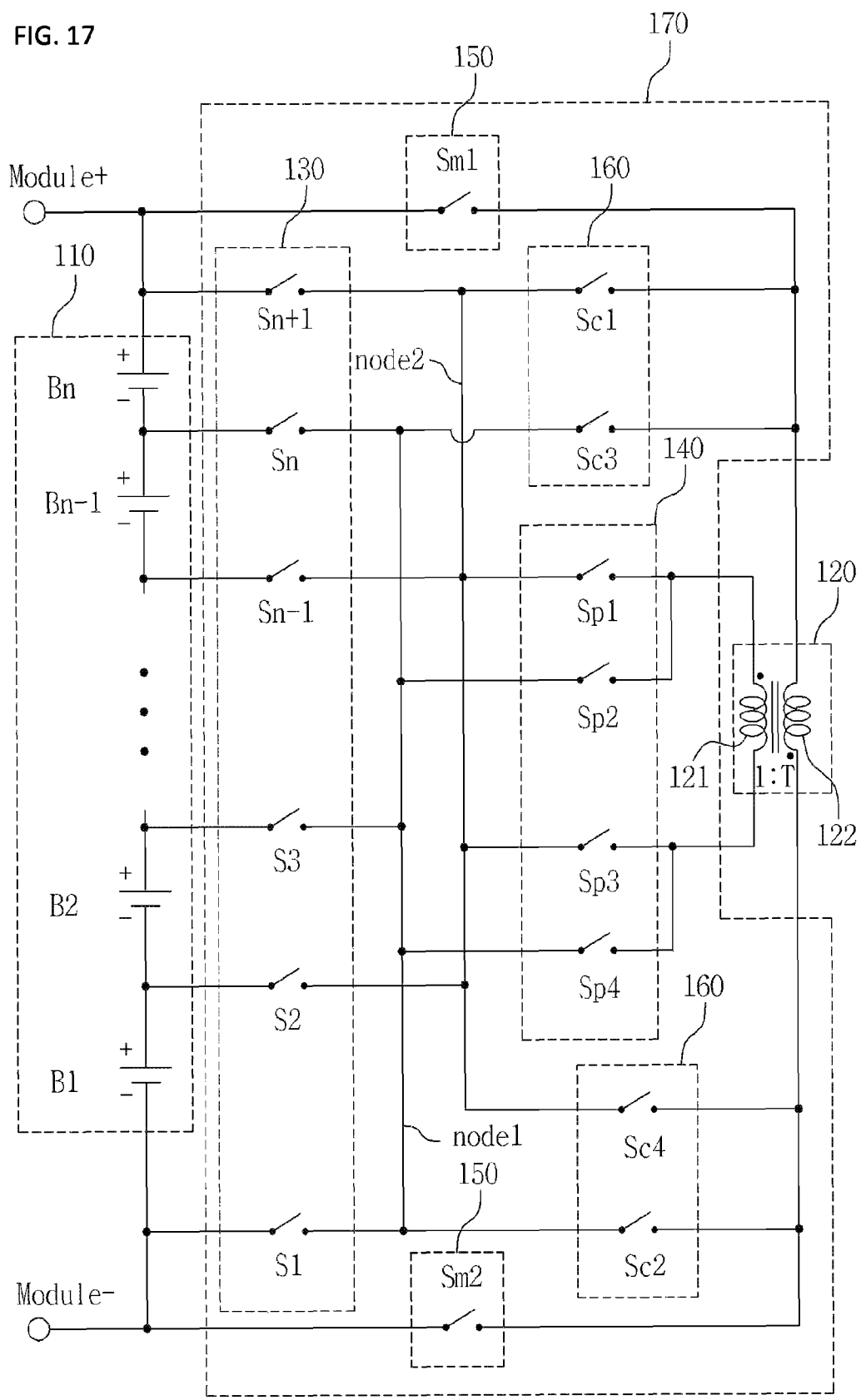
FIG. 17 is a circuit diagram illustrating the configuration of a balancing device modified from the balancing device of FIG. 5 in accordance with still another embodiment of the present invention.

FIG. 17 is a circuit diagram illustrating the configuration of a balancing device modified from the balancing device of FIG. 5 in accordance with still another embodiment of the present invention. As compared with the balancing device shown in FIG. 5, the balancing device shown in FIG. 17 additionally includes switches Sc3 and Sc4 in the auxiliary switch unit 160. The switch Sc3 functions to connect the non-dotted terminal of the secondary winding 122 of the transformer 120 to common node 1, and the switch Sc4 functions to connect the dotted terminal of the secondary winding 122 of the transformer 120 to common node 2. While the balancing device shown in FIG. 5 allows any one terminal of the secondary winding 122 of the transformer 120 to access only one node of common nodes 1 and 2, the balancing device shown in FIG. 17 allows each terminal of the secondary winding 122 of the transformer 120 to access any node of common nodes 1 and 2 because additionally including the switches Sc3 and Sc4 in the auxiliary switch unit 160. Therefore, each terminal of the secondary winding 122 of the transformer 120 can access any terminal of cells in any direction (e.g. in a charging direction or in a discharging direction), so that the degree of freedom in the balancing algorithm design increases more, an effective balancing function can be performed.

Figure 18:
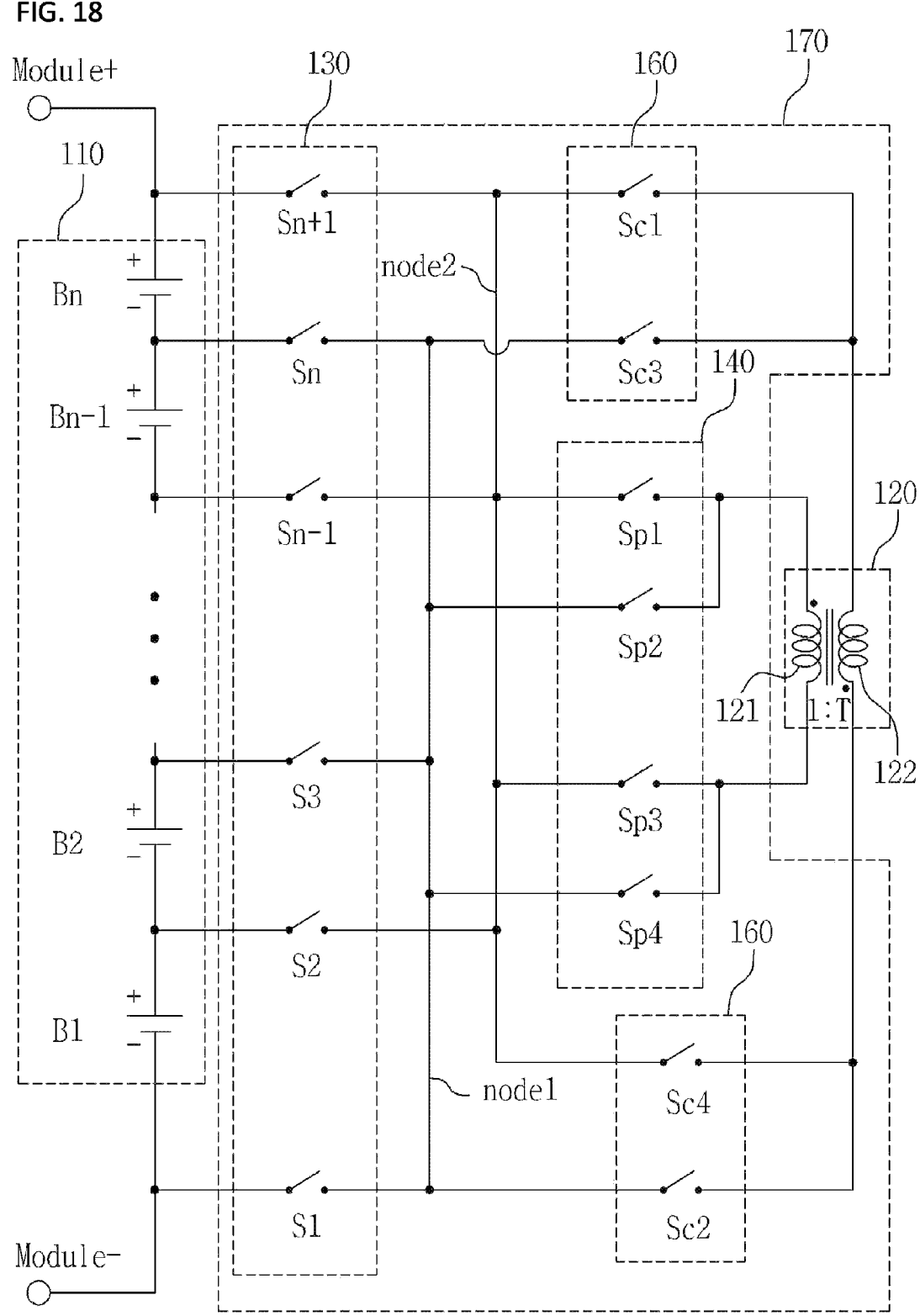
FIG. 18 is a circuit diagram illustrating the configuration of a balancing device modified from the balancing device of FIG. 17 in accordance with still another embodiment of the present invention.

FIG. 18 illustrates the configuration of a balancing device modified from the balancing device of FIG. 17 in accordance with still another embodiment of the present invention. The balancing device shown in FIG. 18 in accordance with an embodiment of the present invention is different from the balancing device shown in FIG. 17 in that the former does not use the module switch unit 150. The switch Sm1 of the module switch unit 150 functions to connect the "+" terminal of the module 110 with one terminal of the secondary winding 122 of the transformer 120, and the function of the switch Sm1 can be substituted by the switches Sn+1 and Sc1. When the switch Sm1 of the module switch unit 150 is used, current flows through one switch, so that loss is reduced as compared with the case where current flows through two switches Sn+1 and Sc1. However, when the number of switches is a burden, the switch Sm1 may be removed. Similarly, the switch Sm2 of the module switch unit 150 may also be substituted by the switches S1 and Sc2, and it can be determined whether or not the switch Sm2 is to be used by taking the number of switches and loss into consideration. The balancing device shown in FIG. 18 in accordance with an embodiment of the present invention can operate in all the modes in which the balancing device shown in FIG. 17 in accordance with an embodiment of the present invention can operate. Thus, the balancing device shown in FIG. 18 can perform an effective balancing function even using a smaller number of switches than the balancing device shown in FIG. 17.

As described above, according to the balancing device and method in accordance with the embodiments of the present invention, all the balancing operations from a cell or cells to a cell or cells, from a cell or cells to a module, and from a module to a cell or cells can be performed even using a smaller number of switches than in the prior art, and operation modes in which various current gains "1", "1/T" and "T" are obtained can be used in each balancing operation. Thus, through the balancing device and method according to the present invention, an effective balancing function can be performed at a low manufacturing cost.

Although the above description has been given with a battery cell as an example, the battery cell is illustrated as an energy storage unit. Therefore, the energy storage unit to be balanced may include one battery cell, a set of battery cells, a battery module, or one or more energy storage units besides a battery. In addition, while the position of the dots for the primary winding 121 and secondary winding 122 of the transformer 120 are specified and described, the dots for both windings of the transformer 120 may be located at positions different from those illustrated above. When relative positions of the dots for the primary winding 121 and secondary winding 122 are different from those illustrated above, the operation of the switch network 170 has only to be controlled by taking into consideration the fact that the direction of current varies depending on the changed positions of the dots when energy stored in the transformer 120 is discharged.

The above description about the balancing operation has been given on an example in which balancing is performed in such a manner as to charge the transformer 120 by one switching operation and to discharge the transformer 120 by one switching operation. However, while charging and discharging of the transformer 120 are repeated by short periods during one balancing operation (e.g. during an energy transference period from a cell Bn to a cell B1), energy transference may be performed in a scheme, such as a pulse width modulation (PWM) scheme. When the PWM scheme is used, charging and discharging can be repeated in a short period, so that the size of the transformer 120 can be reduced, the amount of transferred energy can be easily controlled.

In addition, although the above description has not been given on the case where charging or discharging current is given to or taken from the outside of the battery module 110 during a balancing operation, the balancing device according to the present invention can perform normal operations while giving/taking charging or discharging current to/from an exterior even during a balancing operation. However, the balancing device according to the present invention may be configured not to perform a normal charging/discharging operation from/to an exterior during a balancing operation. In this case, a charging/discharging current blocking unit (not shown) for blocking charging/discharging current from flowing from/to an exterior during a balancing operation may be disposed between the battery module 110 and the connection terminals Module+ and Module−. When an external controller (not shown) for the battery module 110 is configured to integrate and control the balancing operation and the charging/discharging operation to/from the battery module 110, the charging/discharging current blocking unit may not be separately included.

In addition, the embodiment shown in FIG. 5 illustrates the case where two-way controllable switches are used for the cell switch unit 130, the polarity switch unit 140, and the auxiliary switch unit 160, and a single-way switch is used for the module switch unit 150. However, the selection of a single-way switch or a two-way switch has been described for illustrative purposes, and a single-way switch or a two-way switch can be appropriately selected and used by taking into consideration the control function for a direction required according to a necessary operation mode. In addition, although the above description has been illustrated on the case where one FET is used for a single-way switch and two FETs are used for a two-way switch, the term "switch" means a unit element having a switching function. Therefore, various types of elements, such as a BJT and an IGBT in addition to the FET, having a switching function may be used, and two or more switching elements may be connected in series or in parallel and be used.

Although preferred embodiments of the present invention has been described for illustrative purposes, those skilled in the art will appreciate that various modifications, additions and substitutions are possible, without departing from the scope and the spirit of the invention as disclosed in the accompanying claims.

What is claimed is:

1. A balancing device for balancing for an energy storage module comprising a plurality of energy storage units connected in series between a first connection terminal and a second connection terminal, the device comprising:
   a transformer comprising a primary winding and a secondary winding; and
   a switch network selectively connecting at least one of the plurality of energy storage units to at least one of the primary and secondary windings of the transformer, wherein the switch network comprises:

a first cell switch unit having one terminal coupled one to one to odd-numbered nodes formed between the first connection terminal and the second connection terminal and another terminal commonly coupled to form a first common node;

a second cell switch unit having one terminal coupled one to one to even-numbered nodes formed between the first connection terminal and the second connection terminal and another terminal commonly coupled to form a second common node; and a polarity switch unit for selectively connecting the first common node and the second common node to one terminal or another terminal of the primary winding, respectively, between the transformer and the first and second cell switch units.

2. The balancing device according to claim 1, wherein the switch network further comprises:
a first auxiliary switch coupled between the first common node and one terminal of the secondary winding; and
a second auxiliary switch coupled between the second common node and another terminal of the secondary winding.

3. The balancing device according to claim 1, wherein the polarity switch unit comprises:
a first polarity switch coupled between the one terminal of the primary winding of the transformer and the second common node;
a second polarity switch coupled between the one terminal of the primary winding of the transformer and the first common node;
a third polarity switch coupled between the another terminal of the primary winding of the transformer and the second common node; and
a fourth polarity switch coupled between the another terminal of the primary winding of the transformer and the first common node.

4. The balancing device according to claim 2, further comprising a module switch unit coupled between the first connection terminal and one terminal of the secondary winding, and coupled between the second connection terminal and the another terminal of the secondary winding.

5. The balancing device according to claim 4, wherein the module switch unit comprises:
a first module switch configured to connect the first connection terminal to the one terminal of the secondary winding of the transformer; and
a second module switch configured to connect the second connection terminal to the another terminal of the secondary winding of the transformer.

6. The balancing device according to claim 2, wherein the first and second cell switch units, the polarity switch unit, and the first and second auxiliary switches comprise two-way controllable switches.

7. The balancing device according to claim 1, wherein the switch network is controlled in a pulse width modulation (PWM) scheme to perform balancing.

8. The balancing device according to claim 1, wherein the switch network is controlled to use a winding, which is used for charging the transformer, when energy stored in the transformer is discharged.

9. The balancing device according to claim 1, wherein the switch network is controlled to discharge energy stored in the transformer using a winding, except for another winding used for charging the transformer, and to transfer energy from at least one energy storage unit to at least one energy storage unit.

10. The balancing device according to claim 1, wherein the switch network is controlled to discharge energy stored in the transformer using a winding, except for another winding used for charging the transformer, and to transfer energy between at least one energy storage unit and an energy storage module.

11. The balancing device according to claim 1, wherein a winding ratio of the primary winding and the secondary winding is 1:T, and the switch network is controlled to vary a current gain, which is a ratio of a magnitude of discharging current of the transformer to a magnitude of charging current of the transformer, depending on selections of a winding for charging the transformer and a winding for discharging the transformer with respect to the winding ratio.

12. A balancing method for an energy storage module in which a plurality of energy storage units are connected in series between a first connection terminal and a second connection terminal, wherein a balancing device comprises a switch network and a transformer, the transformer comprises a primary winding and a secondary winding, and the switch network comprises:
a first cell switch unit having one terminal coupled one to one to odd-numbered nodes formed between the first connection terminal and the second connection terminal and another terminal commonly coupled to form a first common node;
a second cell switch unit having one terminal coupled one to one to even-numbered nodes formed between the first connection terminal and the second connection terminal and another terminal commonly coupled to form a second common node; and
a polarity switch unit for selectively connecting the first common node and the second common node to one terminal or another terminal of the primary winding, respectively, between the transformer and the first and second cell switch units,
the balancing method comprising an inductor mode operation and comprising the steps of:
allowing the transformer to be supplied with energy through one winding of the primary and secondary windings from at least one of the energy storage units; and
allowing the transformer to supply energy to at least one of other energy storage units through the one winding used when energy is supplied.

13. The balancing method according to claim 12, wherein, in the inductor mode operation, current does not flow through another winding of the primary and secondary windings of the transformer.

14. The balancing method according to claim 12, wherein the at least one energy storage unit which supplies energy to the transformer in the inductor mode operation is the energy storage module.

15. The balancing method according to claim 12, wherein the at least one energy storage unit which is supplied with energy from the transformer in the inductor mode operation is the energy storage module.

16. The balancing method according to claim 12, wherein energy transference from at least one energy storage unit to at least one energy storage unit, from at least one energy storage unit to the energy storage module, and from the energy storage module to at least one energy storage unit is all possible by the inductor mode operation.

17. The balancing method according to claim 16, wherein the switch network further comprises:
a first auxiliary switch coupled between the first common node and one terminal of the secondary winding; and a second auxiliary switch coupled between the second common node and another terminal of the secondary winding, wherein, by a transformer mode operation utilizing a winding ratio of the primary and secondary windings of the transformer, energy transference from at least one energy storage unit to at least one energy storage unit, from at least one energy storage unit to the energy storage module, and from the energy storage module to at least one energy storage unit is all possible.

18. A balancing device for balancing for a battery module comprising a plurality of battery cells connected in series to each other, the balancing device comprising:

a transformer comprising a primary winding and a secondary winding; and a switch network provided between the battery module and the primary and secondary windings of the transformer, and configured to comprise a plurality of switches for performing selectively switching, wherein the switch network performs by selecting one mode among a mode for transferring energy from at least one battery cell to at least another battery cell, a mode for transferring energy from at least one battery cell to the battery module, and a mode for transferring energy from the battery module to at least another battery cell, according to selective switching of the plurality of switches, and wherein the switch network comprises:

a first cell switch unit having one terminal coupled one to one to odd-numbered nodes numbered nodes formed between the first connection terminal and the second connection terminal and another terminal commonly coupled to form a first common node;

a second cell switch unit having one terminal coupled one to one to even-numbered nodes formed between the first connection terminal and the second connection terminal and another terminal commonly coupled to form a second common node; and a polarity switch unit for selectively connecting the first common node and the second common node to one terminal or another terminal of the primary winding, respectively, between the transformer and the first and second cell switch units.

19. The balancing device according to claim 18, wherein the switch network further comprises:

a first auxiliary switch coupled between the first common node and one terminal of the secondary winding; and a second auxiliary switch coupled between the second common node and another terminal of the secondary winding, wherein the primary and secondary windings of the transformer has a winding ratio, and wherein the switch network is configured to transfer energy through one of the primary and secondary windings of the transformer, or to transfer energy through a current gain by the winding ratio of the primary and secondary windings of the transformer.

* * * * *